(12) United States Patent
Sasine et al.

(10) Patent No.: US 8,640,611 B2
(45) Date of Patent: Feb. 4, 2014

(54) METHODS FOR COLLECTING, PACKAGING, AND PROCESSING RECYCLABLE WASTE

(75) Inventors: John K. Sasine, South Jordan, UT (US); Charles Jongert, Sandy, UT (US); Marvin Acey, South Jordan, UT (US); Jeffery A. Ashby, Taylorsville, UT (US)

(73) Assignee: Paper and Plastic Partnership, LLC, Salt Lake City, UT (US)

( * ) Notice: Subject to any disclaimer, the term of this patent is extended or adjusted under 35 U.S.C. 154(b) by 0 days.

(21) Appl. No.: 13/610,565

(22) Filed: Sep. 11, 2012

(65) Prior Publication Data

US 2013/0008323 A1 Jan. 10, 2013

Related U.S. Application Data

(60) Continuation of application No. 13/542,347, filed on Jul. 5, 2012, which is a continuation of application No. 12/644,576, filed on Dec. 22, 2009, now Pat. No. 8,230,780, which is a division of application No. 12/245,239, filed on Oct. 3, 2008, now abandoned, which is a division of application No. 11/299,442, filed on Dec. 12, 2005, now abandoned, which is a continuation of application No. 11/166,516, filed on Jun. 24, 2005, now abandoned, application No. 13/610,565, which is a continuation of application No. 12/333,175, filed on Dec. 11, 2008, now abandoned, which is a continuation-in-part of application No. 11/482,356, filed on Jul. 7, 2006, now Pat. No. 7,784,399, which is a continuation-in-part of application No. 11/299,442.

(60) Provisional application No. 60/617,971, filed on Oct. 11, 2004.

(51) Int. Cl.
*B65B 13/02* (2006.01)

(52) U.S. Cl.
USPC .......................................................... 100/3

(58) Field of Classification Search
USPC .......... 100/2, 3; 53/438, 48.1, 48.4, 489, 542, 53/543; 206/835, 449, 451, 593; 428/2
See application file for complete search history.

(56) References Cited

U.S. PATENT DOCUMENTS

| 4,382,108 A | 5/1983 | Carroll |
| 4,682,699 A | 7/1987 | Ertley |

(Continued)

FOREIGN PATENT DOCUMENTS

| SE | 502785 | 1/1996 |
| SE | 502785 C2 * | 1/1996 |

OTHER PUBLICATIONS

U.S. Appl. No. 13/542,347, filed Jul. 5, 2012, Sasine.

(Continued)

*Primary Examiner* — Jimmy T Nguyen
(74) *Attorney, Agent, or Firm* — Workman Nydegger

(57) ABSTRACT

Recyclable waste byproducts are efficiently collected for recycling at stores or other locations by compacting the recyclable waste as layers in a composite bale. The composite bales can be formed using existing cardboard balers that retailers or other stores typically already have for baling recyclable cardboard. In one embodiment, the composite bales are formed by binding together a layer of one type of recyclable waste and a layer of recyclable waste that includes one or more types of recyclable waste byproducts. The layered structure can be modified to omit one of the layers or to add additional waste byproduct layers.

20 Claims, 17 Drawing Sheets

(56) References Cited

U.S. PATENT DOCUMENTS

| | | | |
|---|---|---|---|
| 4,993,563 | A | 2/1991 | Bolling |
| 5,129,329 | A | 7/1992 | Clasen |
| 5,131,210 | A | 7/1992 | Kiya |
| 5,239,919 | A | 8/1993 | Maki |
| 5,392,912 | A | 2/1995 | Grubbs |
| 6,131,376 | A | 10/2000 | Grey |
| 6,274,637 | B1 | 8/2001 | Schallenberg |
| 6,821,592 | B2 | 11/2004 | Rodick |
| 6,821,595 | B2 * | 11/2004 | Murcia et al. .................. 428/49 |
| 7,412,397 | B2 | 8/2008 | Grenchus |
| 7,413,602 | B2 | 8/2008 | Grasso |
| 7,416,142 | B2 | 8/2008 | Baker |
| 7,416,462 | B2 | 8/2008 | Noma |
| 7,416,612 | B1 | 8/2008 | Montie |
| 7,416,641 | B2 | 8/2008 | Denison |
| 7,419,058 | B2 | 9/2008 | Wening |
| 7,784,399 | B2 * | 8/2010 | Sasine et al. ..................... 100/3 |
| 8,230,780 | B2 * | 7/2012 | Sasine et al. ..................... 100/3 |
| 2003/0010669 | A1 * | 1/2003 | Simhaee ........................ 206/554 |
| 2008/0217811 | A1 | 9/2008 | Wolf |
| 2008/0221228 | A1 | 9/2008 | Notari |
| 2009/0029074 | A1 | 1/2009 | Sasine |
| 2009/0148629 | A1 | 6/2009 | Sasine |

OTHER PUBLICATIONS

U.S. Appl. No. 11/299,442, filed May 20, 2009, Office Action.
U.S. Appl. No. 11/482,356, filed Dec. 16, 2008, Office Action.
U.S. Appl. No. 11/482,356, filed May 19, 2009, Office Action.
U.S. Appl. No. 11/482,356, filed Dec. 9, 2009, Office Action.
U.S. Appl. No. 12/245,239, filed May 20, 2009, Office Action.
U.S. Appl. No. 12/245,239, filed Nov. 24, 2009, Office Action.
U.S. Appl. No. 12/245,239, filed Feb. 25, 2011, Office Action.
U.S. Appl. No. 11/482,356, filed Jun. 29, 2010, Notice of Allowance.
U.S. Appl. No. 12/333,175, filed Oct. 4, 2011, Office Action.
U.S. Appl. No. 12/644,576, filed Jul. 12, 2011, Office Action.
U.S. Appl. No. 12/644,576, filed Feb. 6, 2012, Notice of Allowance.
U.S. Appl. No. 13/542,347, filed Oct. 28, 2013, Office Action.

* cited by examiner

METHODS FOR COLLECTING, PACKAGING, AND PROCESSING RECYCLABLE WASTE

CROSS-REFERENCE TO RELATED APPLICATIONS

This application is a continuation of U.S. patent application Ser. No. 13/542,347, filed Jul. 5, 2012, and entitled "METHOD AND PROCESS OF COLLECTING AND PROCESSING RECYCLABLE WASTE," which is a continuation of U.S. patent application Ser. No. 12/644,576, now issued U.S. Pat. No. 8,230,780, entitled "METHOD AND PROCESS OF COLLECTING AND PROCESSING RECYCLABLE WASTE," filed on Dec. 22, 2009, which is a divisional of U.S. patent application Ser. No. 12/245,239, filed on Oct. 3, 2008, now abandoned, which is a divisional of U.S. patent application Ser. No. 11/299,442, filed on Dec. 12, 2005, now abandoned, which is a continuation of U.S. patent application Ser. No. 11/166,516, filed on Jun. 24, 2005, now abandoned, and which claims the benefit of U.S. Provisional Application No. 60/617,971, filed Oct. 11, 2004.

This application is also a continuation of U.S. patent application Ser. No. 12/333,175, filed Dec. 11, 2008, entitled "SYSTEMS, METHODS AND DEVICES FOR COLLECTING, PACKAGING, AND PROCESSING RECYCLABLE WASTE," which is a continuation-in-part of U.S. patent application Ser. No. 11/482,356, filed on Jul. 7, 2006, now issued U.S. Pat. No. 7,784,399, which is a continuation-in-part of U.S. patent application Ser. No. 11/299,442, filed on Dec. 12, 2005, now abandoned, which is a continuation of U.S. patent application Ser. No. 11/166,516, filed on Jun. 24, 2005, now abandoned, and which claims the benefit of U.S. Provisional Application No. 60/617,971, filed Oct. 11, 2004.

This application expressly incorporates herein, by reference, the entirety of each of the foregoing applications.

BACKGROUND OF THE INVENTION

1. The Field of the Invention

The present invention relates to the field of recycling. More particularly, the present invention relates to systems, methods, and devices for collecting and processing recyclable waste byproducts through the formation of bales including the recyclable waste.

2. The Relevant Technology

As the consuming public demands increased convenience when shopping for products and services, retail and wholesale distribution centers are following the "super-center" trend and carrying not only greater quantities and varieties of products, but are also offering services which have previously required consumers to visit a separate store. With the increased quantity and variety of products and services, the amount of waste generated at such retail and wholesale centers has also increased. As a result, recycling is increasingly important to control the costs associated with this increased amount of waste.

By way of example, retail and wholesale centers are now common which merge the traditional department stores carrying clothing with a grocery store. As a result, customers can visit a single store to obtain most of the items the customer may need, whether it be groceries or clothing. Moreover, many of these stores offer an even greater one-stop-shopping experience by combining even more types of products and services into a single establishment.

For instance, a single store may now offer not only clothing and grocery items, but also furniture, electronics, office supplies, automobile parts, sporting goods, and the like. Some retail and wholesale distribution centers have expanded even further and provide auto servicing centers, business centers, beauty salons, restaurants and vending areas, photography studios, and the like all under the same roof.

Each type of product or service potentially brings with it various types of recyclable and non-recyclable waste which must be dealt with by the retail or wholesale center. For example, the use of plastic wrap and plastic film bags is increasingly permeating more and more aspects of retail sales as well as the shipping and packaging industry. For example, plastic shopping bags are well known to the general public as they are a predominant method for consumers to carry groceries and other purchased goods from a store. An even greater volume of plastic film, however, is generated for product packaging and distribution. For example, palates of goods are frequently wrapped with large sheets of shrink wrap plastic film to keep the contents of the pallet from shifting or falling during transit. Groceries may, for example, be loaded by a distributor onto the pallet and then wrapped with shrink wrap in this manner.

Another example is in clothing distribution in which each garment is typically transported wrapped in its own plastic sleeve and/or included with a plastic clothing hanger used by the retailer to store and display the item. Some estimates are that plastic bags on apparel can account for over sixty percent of plastic waste at retail department stores.

Restaurants and vending areas may also receive food items and food containers which are similarly packaged and wrapped in shrink wrap that must be disposed of by the store. In addition, recyclable products such as aluminum beverage cans or drink bottles made of polyethylene terephthalate (PET) or another plastic may collect in such areas and, if not recycled, are also discarded by the store. Business centers and auto servicing centers similarly produce still other waste byproducts. For example, an auto servicing center may provide various servicing options such as oil changes and fluid exchange services. As a result, the auto servicing center may produce and discard large numbers of gallon bottles used to store window washing fluid or antifreeze/coolant or quart bottles used to store motor oil. In some cases, such bottles are made of high density polyethylene (HDPE) or another recyclable plastic. Business centers, in which consumers may make photocopies or access computers to print documents or images, may also produce large amounts of discarded paper and shredded paper. Such paper, coupled with the paper and shredded office paper produced by the store's managing office, is often a large quantity of recyclable waste.

With this vast amount of plastic and other recyclable waste byproducts used in the packaging and shipping industries, and in the everyday operations of a retail or wholesale distribution center, there is a need to recover this material out of the waste stream in an efficient and effective manner. Stores that aggressively collect and recycle waste byproducts separate from other garbage frequently save hundreds of dollars per month in the cost of trash hauling. Still, the storage, baling, shipping, and processing of plastic and other recyclable waste byproducts is extremely inefficient under current methods.

At stores and distribution centers, for example, one conventional method of collecting plastic waste film for recycling is to stuff the plastic into other large plastic bags and toss them somewhere in the facility in a haphazard fashion (e.g., on top of other bales or bins). For transportation, the bags are thrown into the back of a truck for transportation. Similar methods are often used for collecting other recyclable waste byproducts such as beverage containers, plastic bottles, shredded paper, and plastic hangers. These methods are, however, extremely inefficient uses of space.

Because of these challenges, much of otherwise recyclable waste is disposed of as garbage. Not only does this add to pollution and more quickly fill landfills, but the recyclable waste byproducts fill on-site trash receptacles very quickly. Because waste is typically paid for by volume, i.e. the number of waste containers hauled off, the large volume of recyclable waste that is disposed of in on-site trash receptacles represents a significant cost. In addition, such waste has a recycling value that is unrealized when the recyclable waste is disposed of as garbage.

Despite the challenges in collecting recyclable waste byproducts, uses for recycled waste are quickly expanding. For example, recycled plastic is now used in plastic garbage can liners, landfill liners, agricultural film, and composite lumber products for picnic tables, park benches, porches, and walkways where rot-resistant wood-like products are desired. Shipping containers, carpet materials, and hard plastic containers are also more and more frequently made with recycled plastics. This increased demand for products made from recycled materials is fueling an increased demand for the collection of recyclable plastic and other waste.

In addition, recent increases in the cost of raw petroleum have led to a dramatic increase in the cost of plastics for plastic products. As a result, the per pound value of collected recyclable plastic has also increased dramatically. This adds to the demand for the collection of recyclable plastic.

Nevertheless, the volume of plastic and other waste that is collected for recycling remains considerably lower than is feasible. One key limitation on the use of recyclable waste is that the waste is often difficult and costly to collect. For example, consumers using small plastic bags rarely return them to a source whereby they can be recycled. In addition, at department stores shrink wrap plastic, garment bags, plastic clothing hangers, plastic bottles, metal cans, and the like are often discarded rather than collected. In particular, at department stores and warehouse stores recyclable materials, such as shrink wrap plastic, garment bags, plastic clothing hangers, plastic bottles, metal cans, and the like, are often discarded because the volume of space required to store all the recyclable materials accumulated within the store becomes too expensive to dedicate to that purpose. Although there are feasible methods for collecting such waste products, such as dedicated compacters and balers for each type of waster product, these devices are too expensive and the volume of space that must be dedicated to storing pre-compacted recyclable waste is usually impractical for most businesses. For instance, the amount of plastic film or garment bags necessary to form an entire bale of only plastic may take weeks or months to accumulate. The same holds true for plastic bottles, metal cans, and the like.

By analogy, efforts at recycling cardboard have been much more successful. Cardboard recycling is performed at retailers, for example, by using large cardboard balers to compact waste cardboard and form the waste cardboard into bales for storage and transportation to cardboard recycling facilities. Cardboard balers are generally not used for recycling other types of recyclable materials, however, because they are often too large for the volume of specific types recyclable materials that are dealt with. Cardboard balers are typically designed to form forty-eight inch tall bales. The amount of individual types of recyclable material, such as plastic film, plastic bottles, metal cans, and the like, it would take to form a forty-eight inch tall bale typically cannot be stored by most, if not all, retailers. As a result, unlike cardboard, for which there is an efficient recycling infrastructure, there is currently no effective method for collecting large volumes of other types of recyclable materials.

In addition, cardboard cannot be mixed with plastic or other recyclable waste products during recycling. This is because they are completely different materials that are recycled by very different chemical and mechanical processes. There are also no efficient methods to separate such waste byproducts from cardboard since the value of either material does not justify the labor. For this reason, it is well known that the presence of plastic film, for example, in a cardboard bale leads to rejection of the entire bale such that it is discarded rather than recycled.

Accordingly, it would represent an advance in the art to provide systems and methods to more efficiently and less expensively collect and process recyclable waste byproducts for use in downstream recycling processes.

BRIEF SUMMARY OF THE INVENTION

The present invention relates to the collection of recyclable waste in bulk form. As noted above, the disposal or collection of recyclable waste from large retail stores, discount warehouses, and distribution centers has heretofore presented a significant cost to companies that made it inefficient or impractical. This difficulty in recovering recyclable waste results in the waste of a significant amount of otherwise recyclable materials and reduces profits for those that do not collect and recycle these byproducts.

These problems are overcome by the herein disclosed methods for the collection of recyclable waste within composite bales formed through novel methods of using balers such as conventional cardboard balers. In general, a composite bale is formed of multiple types of recyclable materials. For instance, a layer of recyclable cardboard can be combined with one or more layers of a different type of recyclable waste byproduct to form a composite bale. Similarly, one or more layers of a first type of recyclable waste byproduct, such as plastic film, can be combined with one or more layers of a second type of recyclable waste byproduct, such as metal cans, to form a composite bale. Still further, different recyclable waste byproducts, such as plastic film, plastic bottles, and shrink wrap, can be combined, either in layers or randomly, to form a composite bale. Thus, an amount of a type of waste insufficient to form a bale by itself can be combined with one or more different types of waste and compacted in a composite bale. As a result of these improved methods, a locale can use a cardboard baler not only to form cardboard bales, but also to form composite bales having any number of different recyclable materials therein.

Accordingly, a first embodiment of the invention is a composite bale formed of recyclable waste. The bale generally includes a layer of plastic that has a generally uniform thickness. The layer of plastic can include, for example, plastic bags, plastic film, or shrink wrap. The bale also includes a layer of recyclable waste on top of and in contact with the layer of plastic. The recyclable waste layer can also have a substantially uniform thickness. In addition, the recyclable waste layer itself may include multiple types of recyclable waste byproducts. For instance, by way of example, the layer may include used plastic bags, plastic film, aluminum cans, plastic bottles, plastic hangers, shredded paper, additional cardboard, and the like. The layer of plastic and the layer of recyclable waste are compactly bound together to facilitate transportation and storage of said bale.

Another embodiment of the invention is a method for using a baler to collect recyclable waste. The method generally includes forming a composite bale of multiple recyclable materials by forming a layer of plastic and forming a layer of recyclable waste on top of the layer of plastic. The layer of recyclable waste can include multiple types of recyclable waste byproducts. The layer of plastic and the layer of recyclable waste are then compacted together with the baler. The compacted layers are bound together to maintain the bale in its compacted form.

Yet another embodiment of the invention is composite bale formed of recyclable waste. The composite bale includes a layer of recyclable waste. The layer of recyclable waste includes a plurality of types of recyclable waste products. At least a portion of the recyclable waste products are packaged in one or more compressible containers. Each of the one or more compressible containers can be dedicated to a single type of the plurality of types of recyclable waste products. Plastic bags or plastic film can further be sandwiched between the compressible containers of recyclable waste, either with or without a container of its own, to bond the containers of waste together and maintain the structural integrity of the bale during stacking, storage and/or transport. The layer of recyclable waste is compactly bound together to facilitate transportation and storage of the bale.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of cardboard balers and recyclable waste byproducts have not been described in particular detail in order to avoid unnecessarily obscuring the present invention.

Figure 1:
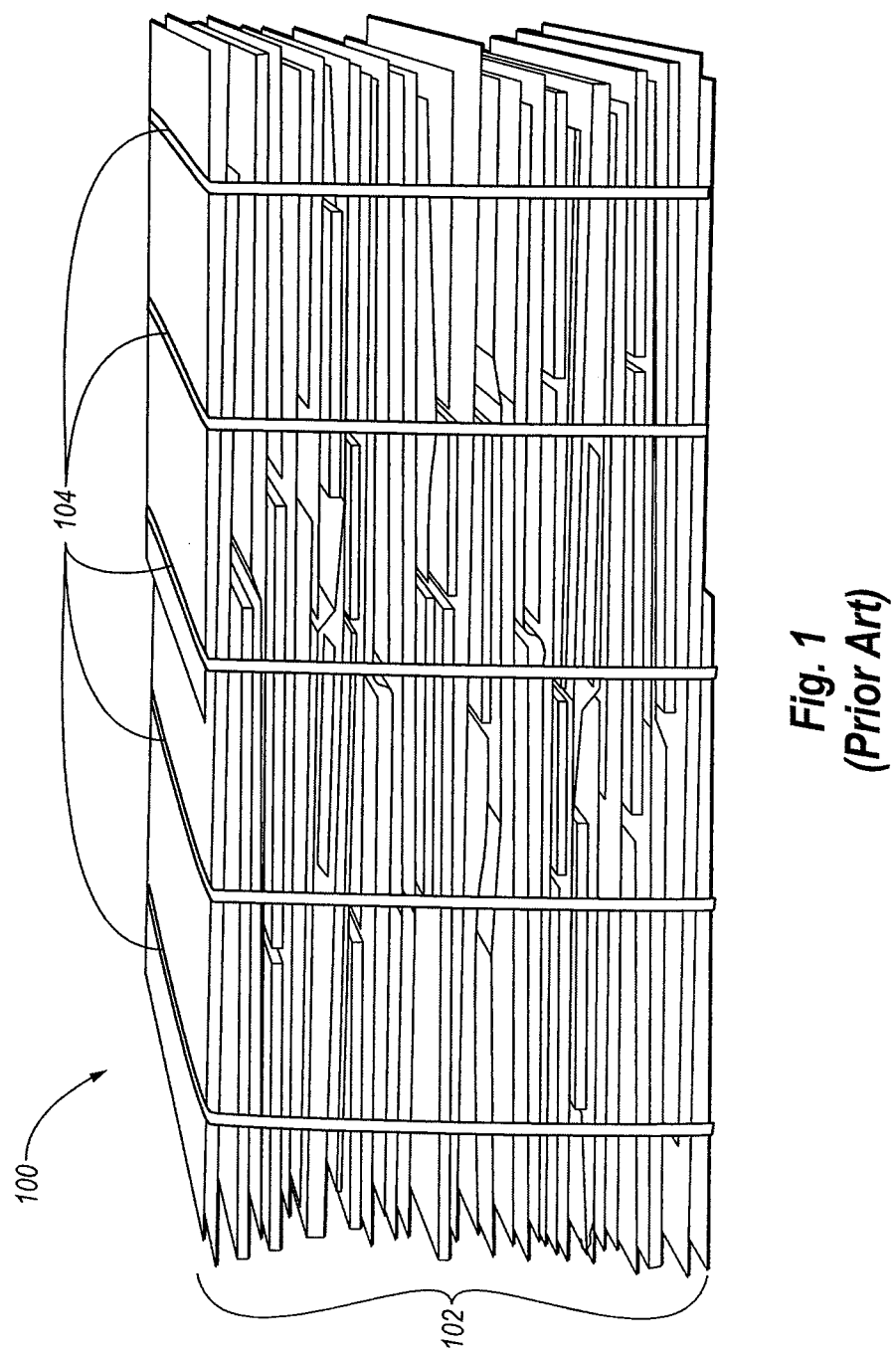
FIG. 1 illustrates a cardboard bale according to the prior art.
Figure 9:
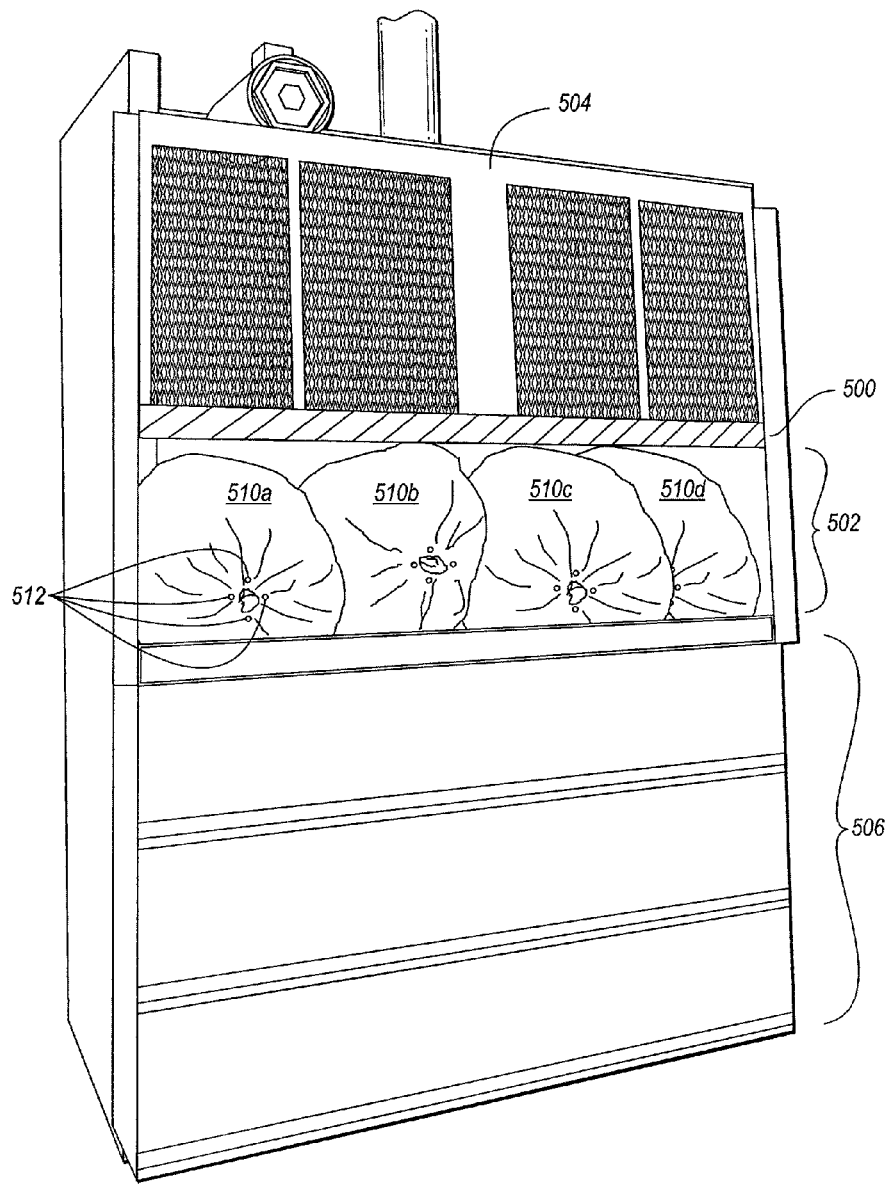
FIG. 9 illustrates the insertion of recyclable waste byproducts into a cardboard baler for forming a composite bale according to embodiments of the invention.

Referring now to FIG. 1, a conventionally formed cardboard bale 100 includes a compacted single layer 102 of cardboard. As depicted, the compacted cardboard bale 100 is bound together by bands 104 to keep the cardboard bale 100 in a compacted state. Cardboard bale 100 can be formed by a cardboard baler as generally depicted in FIG. 9 or any other suitable baler or device used to compact cardboard. Typically, the majority of the individual pieces of cardboard that form cardboard bale 100 come from the same product distribution activities that generate most recyclable plastic film.

As previously noted, it has been conventionally held that cardboard cannot be mixed with plastic film or other types of recyclable waste byproducts in collecting the materials for recycling. More particularly, the chemical and mechanical processes for recycling cardboard cannot work if plastics, metals, or other recyclable materials are also present. It has therefore been axiomatic that cardboard bales, such as bale 100, cannot contain any plastic film or other recyclable waste byproducts, or the whole bale must be discarded. This is not only because the materials cannot be mixed in recycling processes, but the cost of separating other recyclable waste from the cardboard is too high for cost-effective recycling. The same holds true for mixing other types of recyclable materials. Specifically, the cost of separating and the differing recycling processes for plastics, metals, papers, etc. have prevented these types of materials from being mixed together in a single bale. As a result, mixed bales of recyclable material, including materials such as cardboard, plastic, metal, glass, and other types of recyclable waste have heretofore been discarded as waste.

Figure 2:
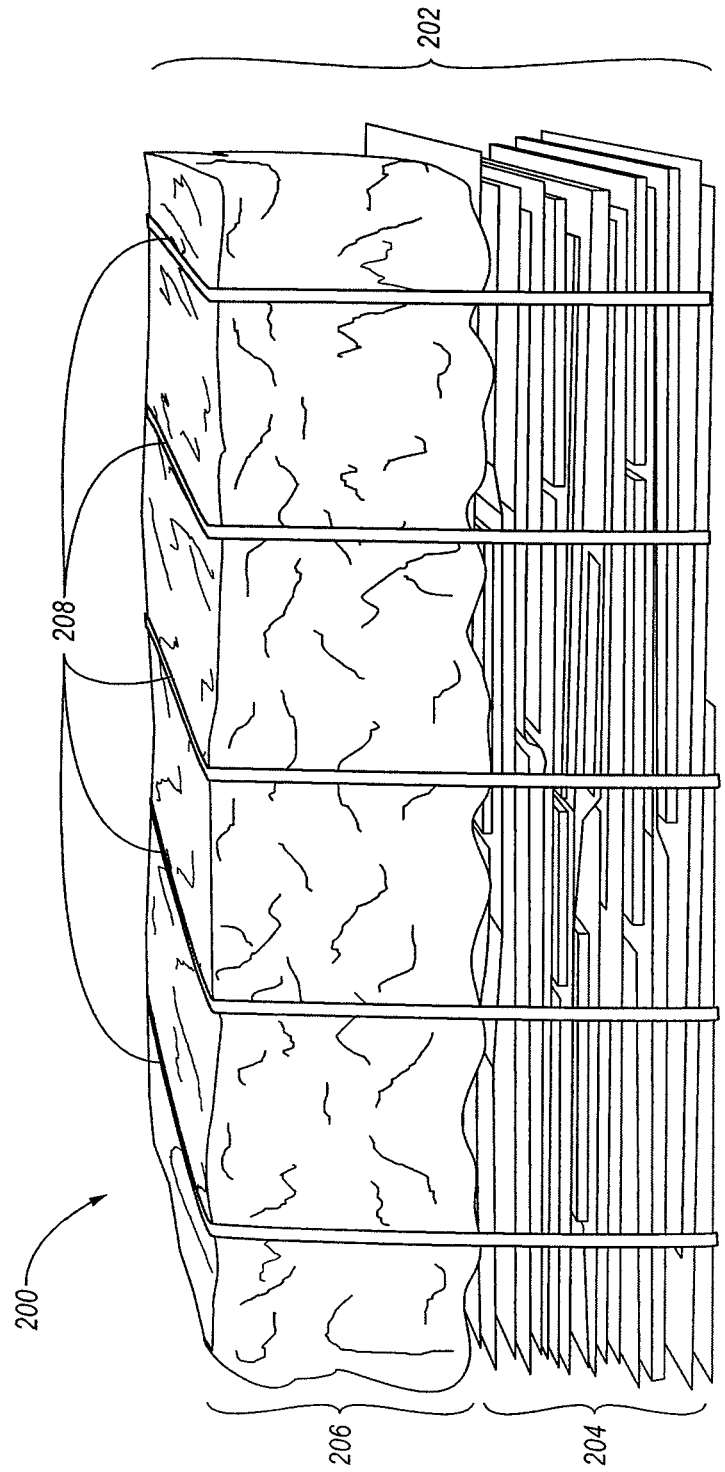
FIG. 2 illustrates a plastic/cardboard composite bale according to one embodiment of the invention.

Contrary to this conventional thinking, however, it has been surprisingly found that various types of recyclable waste can be effectively combined to form a combined, composite bale. As generally depicted in FIG. 2, one embodiment of such a combined composite bale 200 having a thickness 202 incorporates a first layer 204 of cardboard and a second layer 206 of plastic, such as plastic film and/or used plastic bags. In the illustrated embodiment, the plastic layer 206 is positioned on top of cardboard layer 204. Bale 200 can be formed in the reverse order with cardboard layer 204 on top of plastic layer 206. In either configuration, the compacted plastic/cardboard bale 200 is bound together by bands 208.

It can be readily seen in FIG. 2 how a significant amount of plastic film has been compacted to a relatively small space in the composite plastic/cardboard bale. In addition, it is also apparent that a significantly less amount of plastic is used in this plastic/cardboard bale than if the entire bale were formed of only plastic film. Thus, because a smaller amount of plastic film can be compacted in a single bale, the plastic can be disposed of in a timely fashion from a single location. In contrast, if the plastic were required to fill the entire bale, it may require many days, weeks, or even months to fill a single bale, requiring great expense to store a significant amount of un-compacted plastic.

Figure 3:
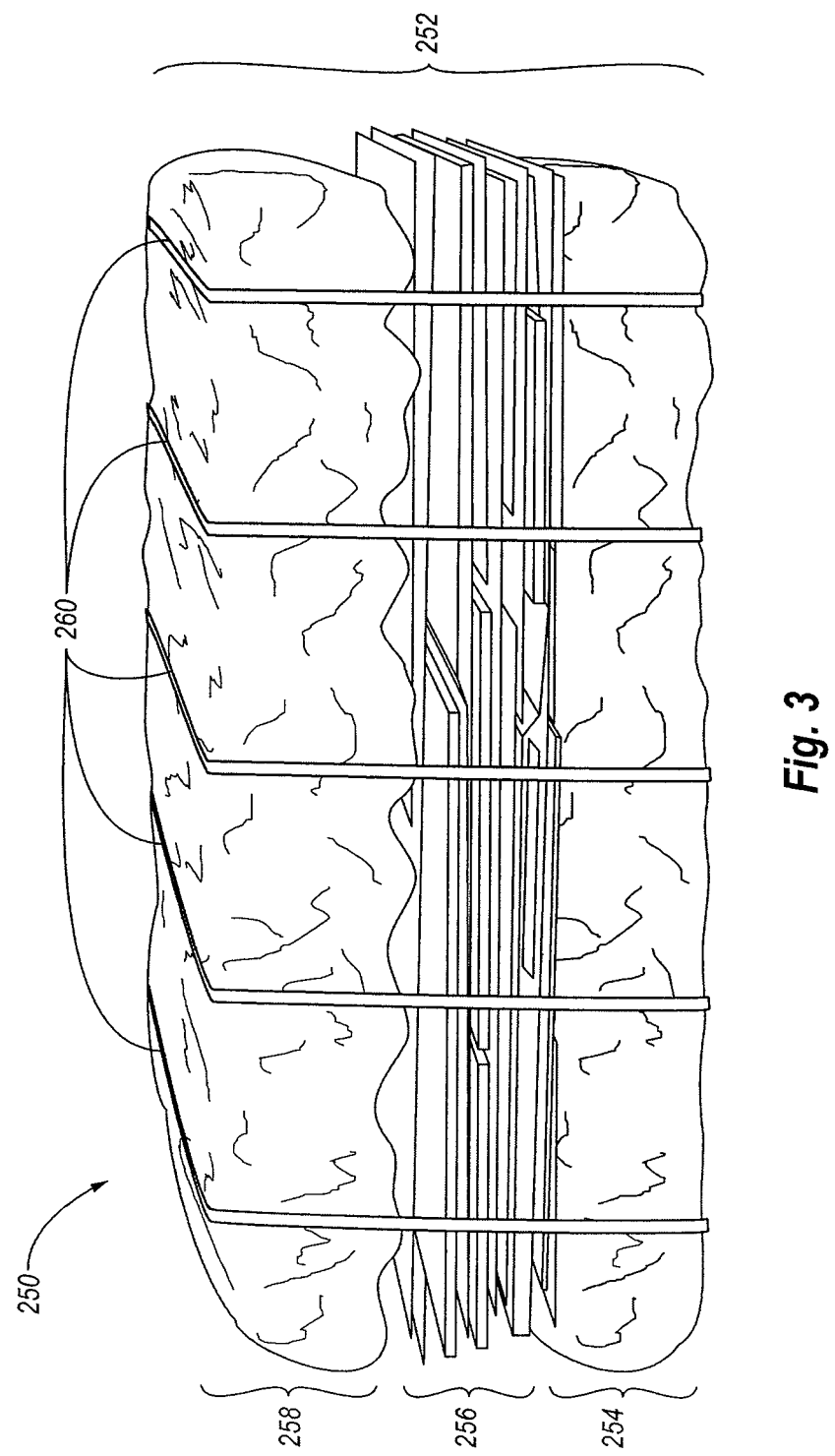
FIG. 3 illustrates a plastic/cardboard composite bale according to another embodiment of the invention.

Now referring to FIG. 3, an additional embodiment of an exemplary composite bale 250 is illustrated. As generally depicted in FIG. 3, composite bale 250 having a thickness 252 incorporates a first layer 254 of plastic, a cardboard layer 256, and a second layer 258 of plastic. The cardboard layer 256 is in effect sandwiched between the two plastic layers 254, 258. The compacted composite bale is bound together by bands 260. Thus, as depicted in FIG. 3, composite bales can be formed with multiple layers of different types of recyclable waste. While FIG. 3 is illustrated has having a single cardboard layer sandwiched between two plastic layers, it will be appreciated that the bale could be formed with a single plastic layer sandwiched between two cardboard layers. Similarly, as discussed in greater detail below, the composite bale can also be formed with a plurality of layers and multiple types of recyclable waste, and the recyclable waste can be arranged in almost any configuration.

Figure 4:
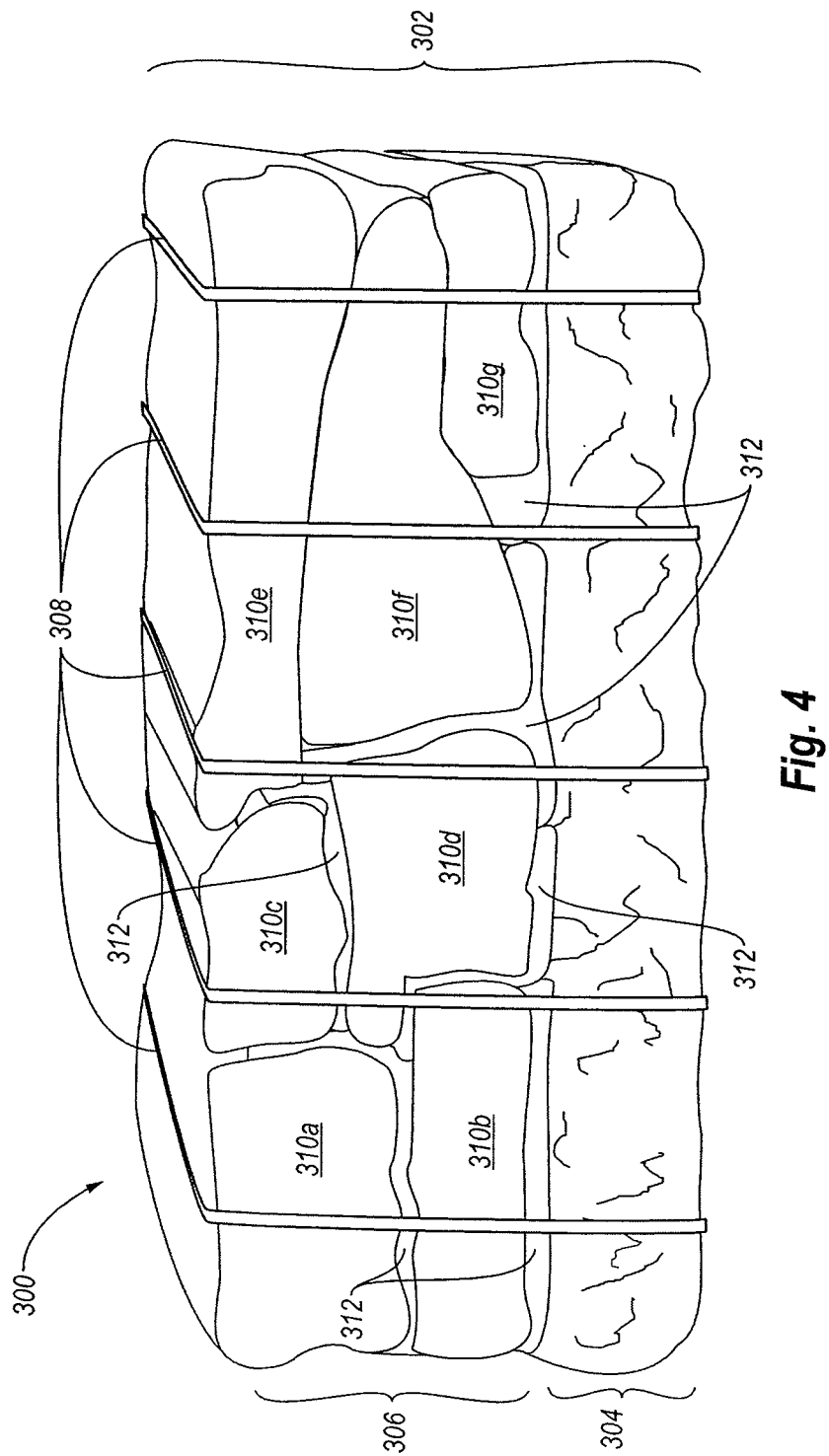
FIG. 4 illustrates a composite bale having two layers of different types of recyclable waste according to yet another embodiment of the invention.

For example, FIG. 4 illustrates an additional embodiment of an exemplary composite bale 300. As generally depicted in FIG. 4, composite bale 300 has a thickness 302 and incorporates a plastic layer 304 and a recyclable waste layer 306 of multiple types of recyclable waste byproducts. The compacted composite bale is bound together by bands 308.

Composite bale 300 acts as a complete packaging system in which a retail or wholesale distribution center—or any other location in which recyclable waste is produced—can package one or more types of recyclable waste byproducts into a single bale for shipment and delivery to a processing and/or recycling center. In the illustrated embodiment, for example, recyclable waste layer 306 includes a plurality recyclable portions 310a-g which include one or more types of recyclable waste. For example, each recyclable portion 310a-g may include one or more types of recyclable waste produced by a retail or wholesale distribution center. For instance, recyclable portions 310a-g may include plastic hangers, shredded paper, plastic or aluminum beverage containers, plastic fluid containers, shrink wrap, used plastic bags, and the like.

As will be appreciated, particularly in light of the disclosure herein, recyclable portions 310a-g may be of varying sizes, shapes and configurations within recyclable layer 306. In some cases, this variation results from the type of recyclable waste byproduct packaged in composite bale 300. More particularly, some recyclable waste products are highly compressible, such that when compacted in a baler, the volume the recyclable waste occupies in the bale can be significantly reduced. For instance, used plastic bags and plastic shrink wrap are pliable and also highly compressible. Similarly, plastic beverage containers, plastic fluid containers, and even aluminum beverage cans may contain a significant amount of air when discarded, and when compacted, the air can be discharged and the volume of the recyclable waste reduced.

Other recyclable waste, however, may be less compressible. For instance, plastic hangers do not capture a significant amount of air and are not pliable. Accordingly, when a volume of plastic hangers is compressed in a baler, the hangers maintain much of their original shape, thereby resulting in compression that can be much less significant than the compression of the same volume of, for example, plastic film or plastic beverage containers.

Accordingly, and as illustrated in FIG. 4, when recyclable portions 310a-g are compressed and baled, the shapes, sizes and configurations of each portion can vary. For instance, a recyclable portion with plastic hangers (e.g., portion 310d) will result in a greater thickness within composite bale 300 than a recyclable portion of the same volume that is filled with a more compressible material (e.g., portion 310g).

As discussed in greater detail herein, different recyclable waste byproducts can be packaged separately within composite bale 300. For instance, recyclable portions 310a-g can each be packaged within a compressible container such as, for example, a plastic bag made of a plastic film material. Separating materials into containers is desirable for a variety of reasons. For example, waste byproducts may be generated at different locales within a retail or wholesale distribution center such that it is more convenient for each different locale to package its recyclable waste byproducts separately. In addition, as discussed in more detail hereafter, such separation may facilitate handling of the byproducts at a processing or recycling center.

In one embodiment, the compressible container is a deformable plastic bag container. For instance, in one embodiment, the various recyclable waste products can be enclosed within a used shopping bag or clothing bag, such that the recyclable waste is enclosed within other types of recyclable waste byproducts. In other embodiments, it however, the compressible container is not a waste byproduct. For instance, a plastic bag may be obtained for the purpose of packaging of the recyclable waste and not generated by the day-to-day operations of a retail, wholesale or distribution center.

With continued reference to FIG. 4, it will be seen that in some embodiments, a composite bale which packages multiple types of recyclable waste byproducts and/or waste byproducts which are not highly compressible, may further be configured to maintain its structural integrity during storage and shipment of the composite bale. For instance, composite bale 30 is adapted to maintain its structural integrity where a potential weak point otherwise exists in the bale.

In particular, when different portions 310a-g of recyclable waste byproducts are compressed together, they may become rigid and/or not conform to the shape of an adjacent portion. Consequently, when the bale is created, the different portions can shift position during storage and/or transport, thereby weakening the bale. To reduce the effect of such weak points, composite bale 300 optionally includes bonding agents 312 between some or all of recyclable portions 310a-g. Optionally, bonding agents 312 can be placed in recyclable layer portion 306 between recyclable portions 310a-g and plastic layer 304.

The bonding agent acts to stabilize the position of recyclable portions 310a-g relative to an adjacent recyclable portion and/or plastic layer 304. In one embodiment, for example, bonding agent 312 includes a compressible material that is sandwiched between two or more of recyclable portions 310a-g. As a result, when a baler compresses bonding agent 312 and recyclable portions 310a-g, the compressible bonding agent 312 can conform to the shape of the adjacent recyclable portions, thereby eliminating or reducing the space between portions and further increasing the structural integrity of the bale.

Bonding agent 312 may comprise any suitable material. For instance, in one embodiment, bonding agent 312 include compressible, recyclable waste byproducts generated by a retail, wholesale or distribution center that packages its recyclable waste into composite bale 300. For instance, byproducts such as plastic film or used plastic bags can be placed between different containers of other recyclable waste products to bond them together and increase the bale strength. Such recyclable waste may be directly placed between recyclable portions 310a-g or, in other embodiments, may be placed within a container such as a plastic bag, and the plastic bag then sandwiched between different recyclable portions.

Figure 5:
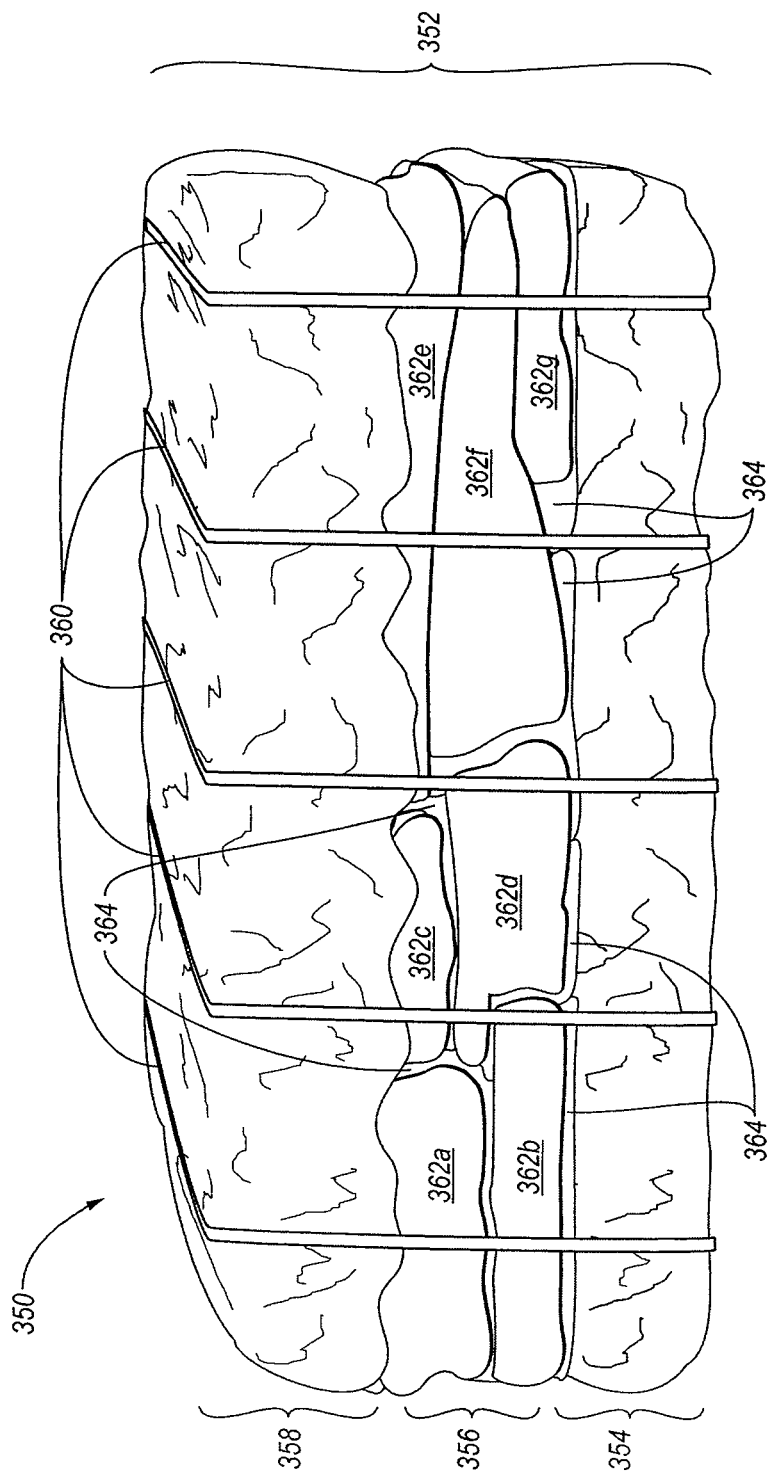
FIG. 5 illustrates a composite bale having three layers of differing types of recyclable waste according to an embodiment of the invention.

Illustrated in FIG. 5 is another exemplary embodiment of a composite bale that can be formed according to the present invention. More specifically, FIG. 5 illustrates a composite bale 350 that has a total thickness 352. Bale 350 is formed of three layers of recyclable waste. The first layer is a plastic layer 354, the second layer is a recyclable waste layer 356 of multiple types of recyclable waste byproducts, and the third layer is another plastic layer 358. The recyclable waste layer 356 is effectively sandwiched between the two plastic layers 354, 356. The compacted composite bale is bound together by bands 360.

Similar to the recyclable waste layer 306 of bale 300, recyclable waste layer 356 of bale 350 also includes a plurality of recyclable portions 362a-g. The plurality of recyclable portions 362a-g can include one or more types of recyclable waste. For example, each recycling portion 362a-g may include plastic hangers, shredded paper, plastic or aluminum beverage containers, plastic fluid containers, shrink wrap, used plastic bags, and the like.

Additionally, recyclable waste layer 356 can also include a bonding agent 364, which is similar to bonding agent 312 discussed above. More particularly, a bonding agent 364, such as plastic film or used plastic bags, can be placed between recycling portions 362a-g to bond them together and increase the strength of the bale as described above with regard to bale 300.

Figure 6:
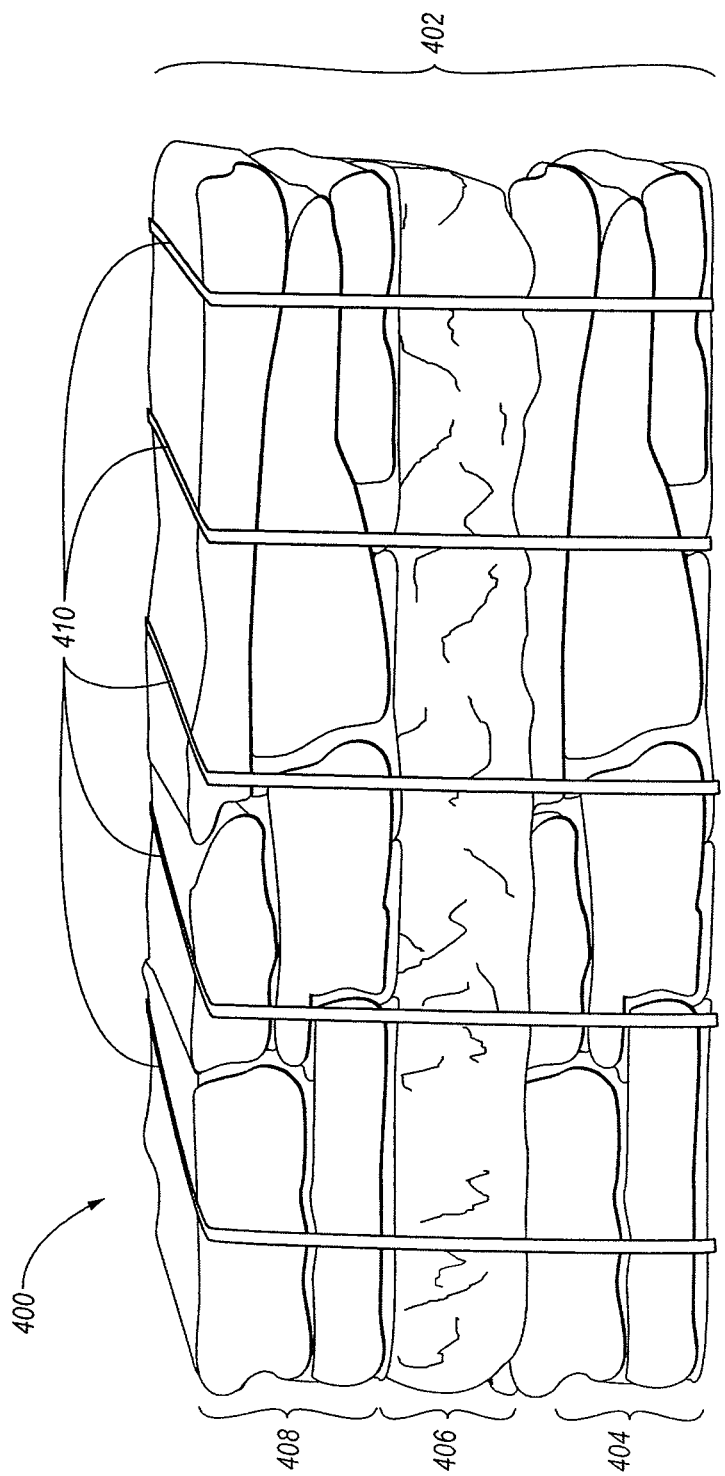
FIG. 6 illustrates another embodiment of a three layer composite bale according to the invention.

FIG. 6 illustrates yet another embodiment of a composite bale formed according to the present invention. There is illustrated a composite bale 400 that has a total thickness 402. Bale 400 has a similar makeup as bale 350, except the layers of recyclable material are reversed. Specifically, bale 400 has a single plastic layer 406 sandwiched between two recyclable waste layers 404, 408. The compacted composite bale 400 is bound together with bands 410.

Each of the recyclable waste layers 404, 408 of bale 400 can include a plurality of recyclable portions, each having one or more types of recyclable waste such as plastic hangers, shredded paper, plastic or aluminum beverage containers, plastic fluid containers, shrink wrap, used plastic bags, and the like. Furthermore, each of the recyclable waste layers can also include a bonding agent, such as plastic film or used plastic bags, placed between the recycling portions to bond them together and increase the strength of the bale as described elsewhere herein.

Figure 7:
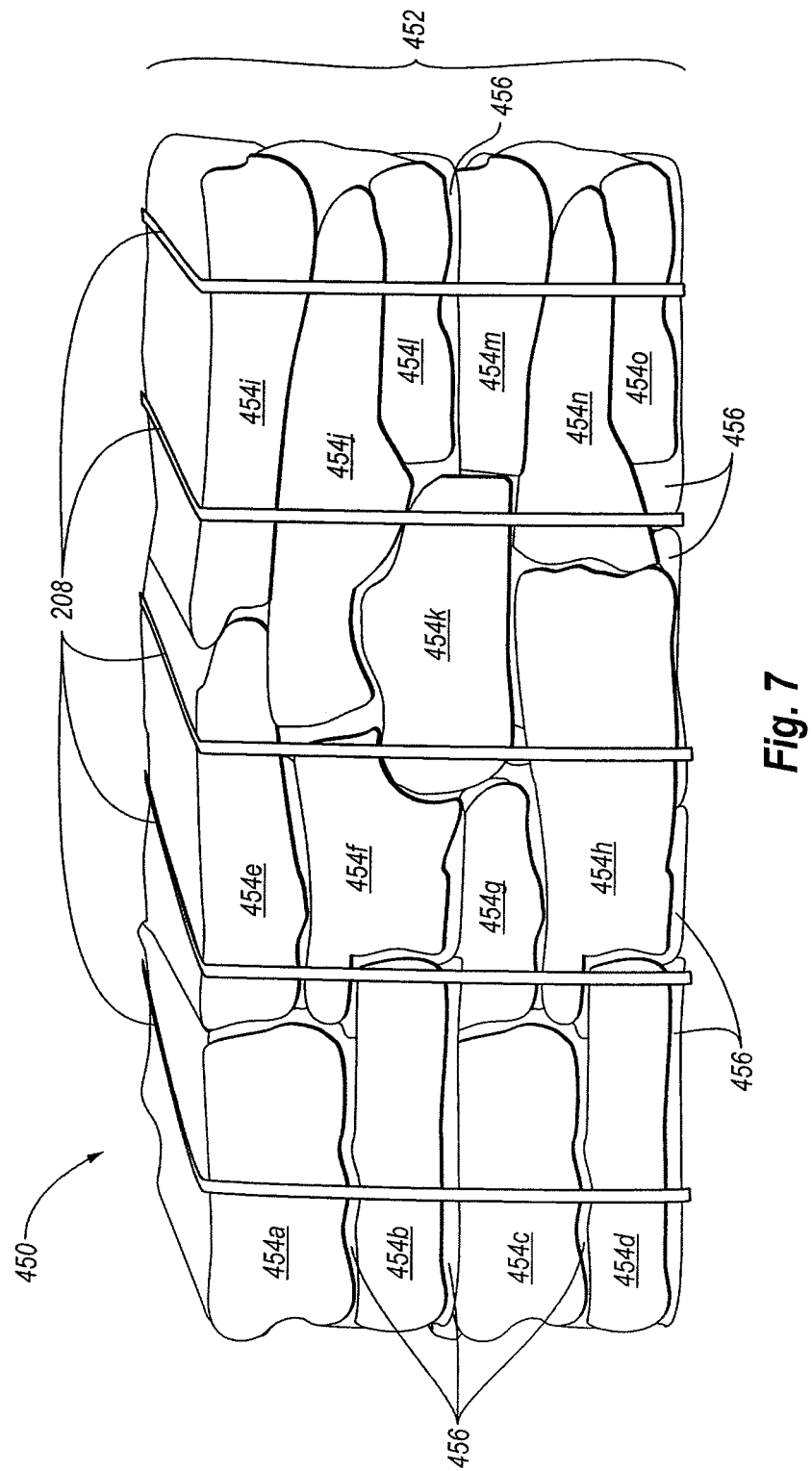
FIG. 7 illustrates a composite bale according to yet another embodiment of the invention, the bale having multiple types of recyclable waste randomly grouped within the bale.

FIG. 7 illustrates still a further embodiment of a composite bale 450 formed according to the present invention. Bale 450 differs from the previously described bails formed according to the present invention in that bail 450 does not comprise multiple layers of different types of recyclable waste. Rather, bail 450 comprises a single recyclable waste layer 452. As with the recyclable waste layers described above, recyclable waste layer 452 includes a plurality of recyclable waste portions 454a-o. Each of the recyclable waste portions 454a-o can include one or more types of recyclable waste. For example, recyclable waste portions 454a-o may include plastic hangers, shredded paper, plastic or aluminum beverage containers, plastic fluid containers, shrink wrap, used plastic bags, and the like.

Furthermore, when bail 450 is formed of differing materials that may not conform to the shape of adjacent materials, bonding agent 456 can be included in bail 450. As described above, the inclusion of a bonding agent, such as plastic film or used plastic bags, between the recyclable waste portions 454a-o can increase the structural integrity of bale 450 by acting to stabilize the position of recyclable portions 454a-o relative to one another.

As noted herein, a composite bale may have any number of layers. For example, a bale may have a one layer of recyclable waste (FIG. 7), two layers of different types of recyclable waste (FIGS. 2 and 4), or three layers of recyclable waste (FIGS. 3, 5, and 6). Additionally, a composite bale may have more than three layers of recyclable waste. For example, a composite bale may have three layers of plastic interposed between four layers of another type of recyclable waste. Thus, it will be appreciated, in view of the disclosure herein, that a composite bale with any number of layers of recyclable waste, with any number of intermediate layers of recyclable waste or cardboard, and which include any of various types of recyclable waste can be formed according to the present invention. The limiting factor is that the thickness of each layer of recyclable waste, and the number of such layers must be cost effective. This use of numerous layers may be preferable in locations where there is little storage space for loose or collected recyclable waste or cardboard, and so it is desirable to frequently compact the on hand loose and collected waste and cardboard in multiple layers. It may also be useful where, for example, different departments or service centers deliver their waste to the a baler at different times, so as to allow compaction of the various types of recyclable waste from a department or service center upon delivery of the waste to the baler.

Figure 8:
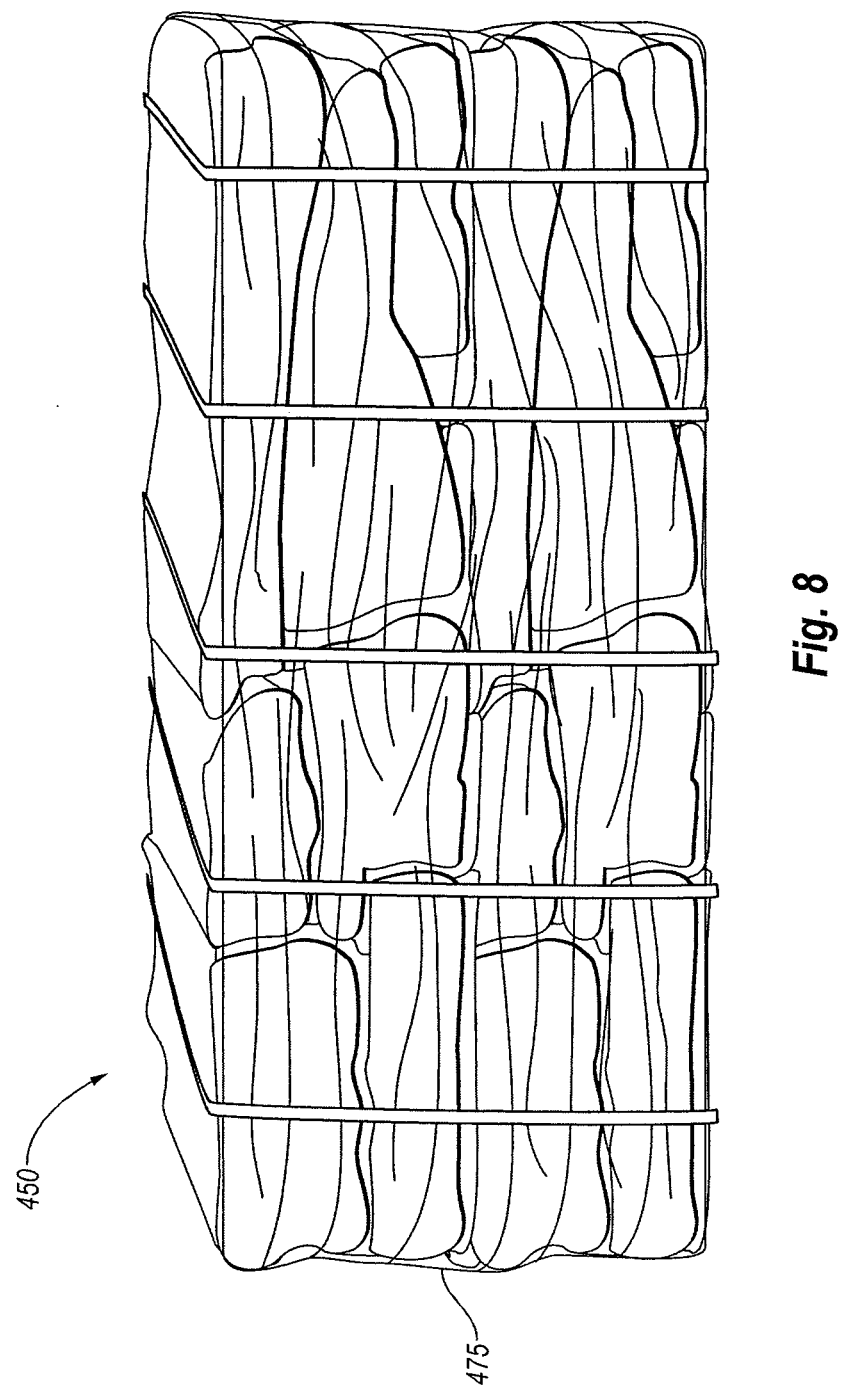
FIG. 8 illustrates the composite bale of FIG. 7 wrapped in shrink wrap.

Attention is now directed to FIG. 8, in which the bale 450 from FIG. 7 is illustrated with shrink wrap 475 wrapped around the sides and ends thereof. Wrapping a compacted composite bale with shrink wrap can provide multiple benefits. For example, during transportation of the composite bale, the bale may be subjected to forces that can harm the structural integrity of the bail. Such forces can be forces normally encountered during transportation, including lifting, stacking, and dropping of the bale. Additionally, bales are often transported on flatbed transport vehicles. The high winds experienced by the bale during transportation on such a vehicle can cause some of the recyclable material in the bale to become dislodged and blow away from the bale.

In order to increase the structural integrity of the bale and prevent materials from falling or blowing out of the bale, the bale can be wrapped in shrink wrap as illustrated in FIG. 8. Wrapping a bale in shrink wrap is an easy, quick, and convenient way to increase the bales structural integrity and enclose any loose materials within the bale. Thus, after the bale has been formed as described herein, an employ of the retail, wholesale or other facility or the transport personnel can simply wrap the bale in shrink wrap prior to transportation.

With reference now to FIG. 9, a conventional cardboard baler 500 is used to form composite bales according to embodiments of the invention. Using conventional cardboard balers greatly reduces the cost to retailers and distributors that already have the balers on-site in that they do not have to acquire another machine nor do they have to store two or more machines, one for cardboard and one for each type of recyclable waste byproduct. The construction and operation of conventional cardboard balers, such as for example cardboard baler 500, is well known in the art and will not be described in great detail herein. Most conventional balers are designed to form 48 inch, 60 inch, or 72 inch bales. While the discussion of FIGS. 9 and 10 refer to a bale formed of a plastic layer and a recyclable waste layer, it will be appreciated, that similar process steps can be followed to form any type of composite bale as described herein.

Figure 10:
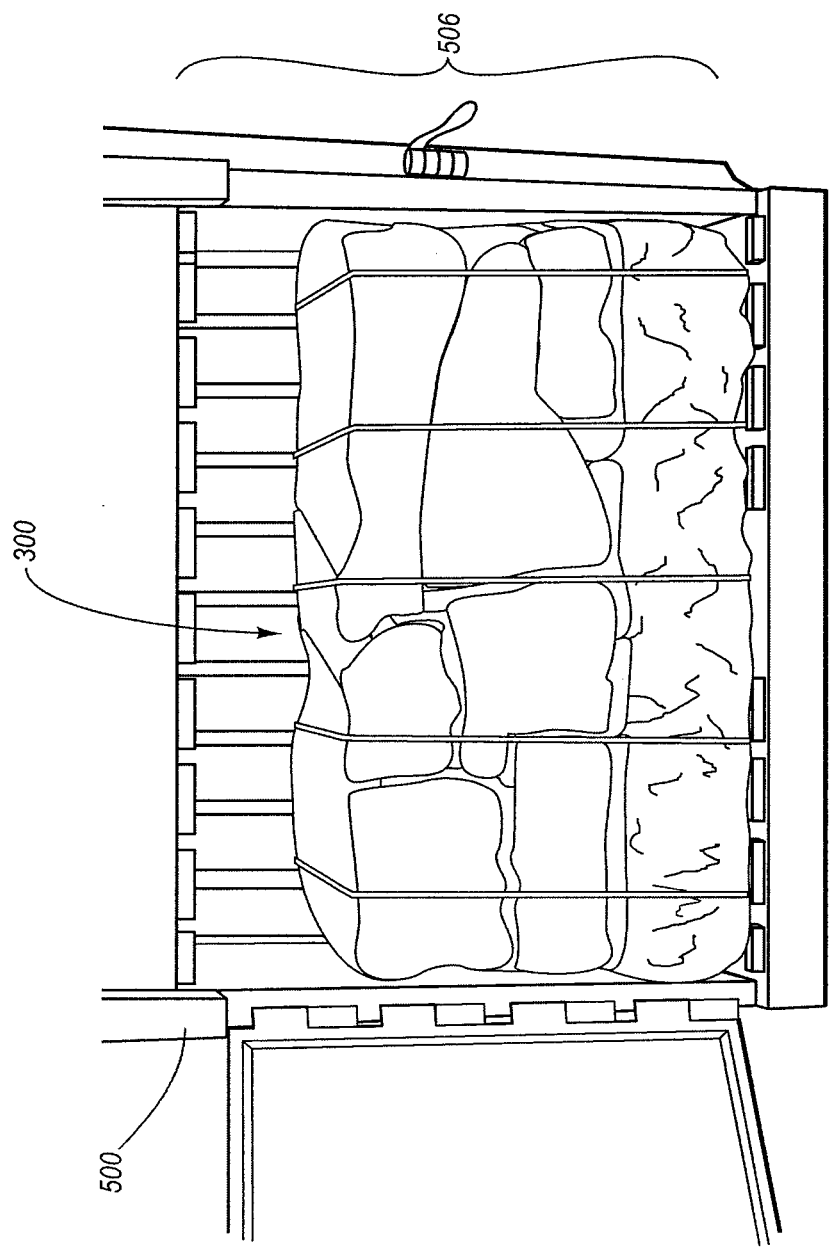
FIG. 10 illustrates a composite bale formed in a cardboard baler according to embodiments of the invention.

Generally, it can be seen that cardboard, plastic, and other types of recyclable waste byproducts can each be inserted through a top opening 502 while a gate 504 is in the open position. In the illustration, a series of bags 510*a-d* containing recyclable waste have been inserted into baler 500. Although not visible in FIG. 9, a layer of compacted plastic is already formed below uncompacted bags 510*a-d* in the bottom portion 506 of baler 500, as can be seen in FIG. 10. After gate 504 is closed, baler 500 can then be operated to compact bags 510*a-d* into a compacted recyclable waste layer over the previously compacted plastic layer. It some embodiments, and with some types of recyclable waste, is preferable to load and compact several cycles of recyclable waste, for example eight to twelve cycles, to form an ideally sized recyclable waste layer.

In some embodiments, such as that illustrated in FIG. 9, bags 510*a-d* may include one or more air release holes 512. Release holes 512 are, in this embodiment formed near the neck of bags 510*a-d* and are configured to allow air to be easily released from bags 510*a-d* when bags 510*a-d* are compacted by baler 500. One feature of holes 510*a-d* is that as bags 510*a-d* are compressed, air can easily flow through bags 510*a-d*, thereby preventing breakage or rupture of bags 510*a-d* that could otherwise occur were air to be trapped inside the bags. Should rupture to occur, the recyclable waste enclosed within bags 510*a-d* could become separated from the bale and/or create voids within the bale. In either case, a weak point in the bale structure may be created, such that prevention of such facilitates maintenance of the structural integrity of the compacted composite bale.

While four release holes 512 are illustrated near the neck of each of bags 510*a-d*, it will be appreciated that this is exemplary only and that any number and placement of holes 512 is contemplated. For example, holes 512 may be positioned at the bottom of bags 510*a-d*, along the length of bags 510*a-d*, or any combination thereof. In other embodiments, bags 510*a-d* are made of a breathable material such that air can be expelled sufficiently through the surface of the bag.

Bags 510*a-d* may further be made of a pliable material that stretches to prevent rupture or breakage before or during compression of the bag by baler 500. This feature may be particularly desirable for some types of recyclable waste byproducts that are rigid, have sharp edges, or which are not highly compressible. For example, plastic clothing hangers may be placed in a flexible bag when they are discarded. To maximize the number of hangers in the bag, the hangers may be manually compressed into the bag, thereby causing the hangers to push against the interior surface of the bag, causing it to tear. By using a bag that stretches, however, the bag may have sufficient give to allow the contents of the bag to shift, and the bag stretches without rupturing. Similarly, when such materials are compacted by cardboard baler 500, the contents of each bag can shift, thereby pushing against the bag and causing it to tear or stretch.

In some embodiments where bags 510*a-d* are plastic and flexible, bags 510*a-d* are made of a linear molecular plastic that stretches to prevent popping, tearing, or splitting of the bag. For example, the bags may be made of a non-porous linear low density polyethylene (LLDPE), although other types of bags are contemplated. For example, in other embodiments, the bag is not stretchable, is porous, and/or is not made of a plastic or polymer material.

After the recyclable waste layer is formed, an operator can insert one or more additional layers of recyclable material, such as another plastic layer, a recyclable waste layer having one or more different types of recyclable materials, a cardboard layer, or the like. After any additionally layers have been inserted into baler 500, the operator can then operate baler 500 to compress the additional layer(s) over the recyclable waste layer. Once all the desired layers have been inserted and compressed, the finished bale is bound, preferably with wire in contrast to conventional plastic bands, so as to keep the bale compacted, after which it is then ejected from the baler 500. Preferably the bales have two wires at each end to further bind the bales.

FIG. 10 illustrates a completed and bound composite bale 300 seated within bottom portion 506 of baler 500. Alternatively, as previously discussed and illustrated in FIGS. 2, 3, and 5-7, bales having one or more layers of different types of recyclable waste can be formed within a single bale.

One example process of implementing the invention involves first gathering recyclable waste to a single location. Such waste may include plastic, paper, metal, or other recyclable materials generated or produced on-site. For example, plastic shrink wrap used to package shipped products, plastic garment bags or clothing hangers removed from clothing prior to or at the time of sale, shredded paper, aluminum beverage cans, plastic beverage bottles, blow molded plastic one gallon or one quart containers, and the like. Such waste byproducts may also be gathered from other locations. For example, a collection location may have a collection program wherein consumers can return their aluminum cans, beverage bottles, or small plastic grocery or shopping bags for recycling. In addition, such items can be collected throughout a community, such as at local schools, to promote recycling and thereby provide the double effect of providing a revenue stream for the store (sales of recyclable waste) and by generating community goodwill.

Figure 11:
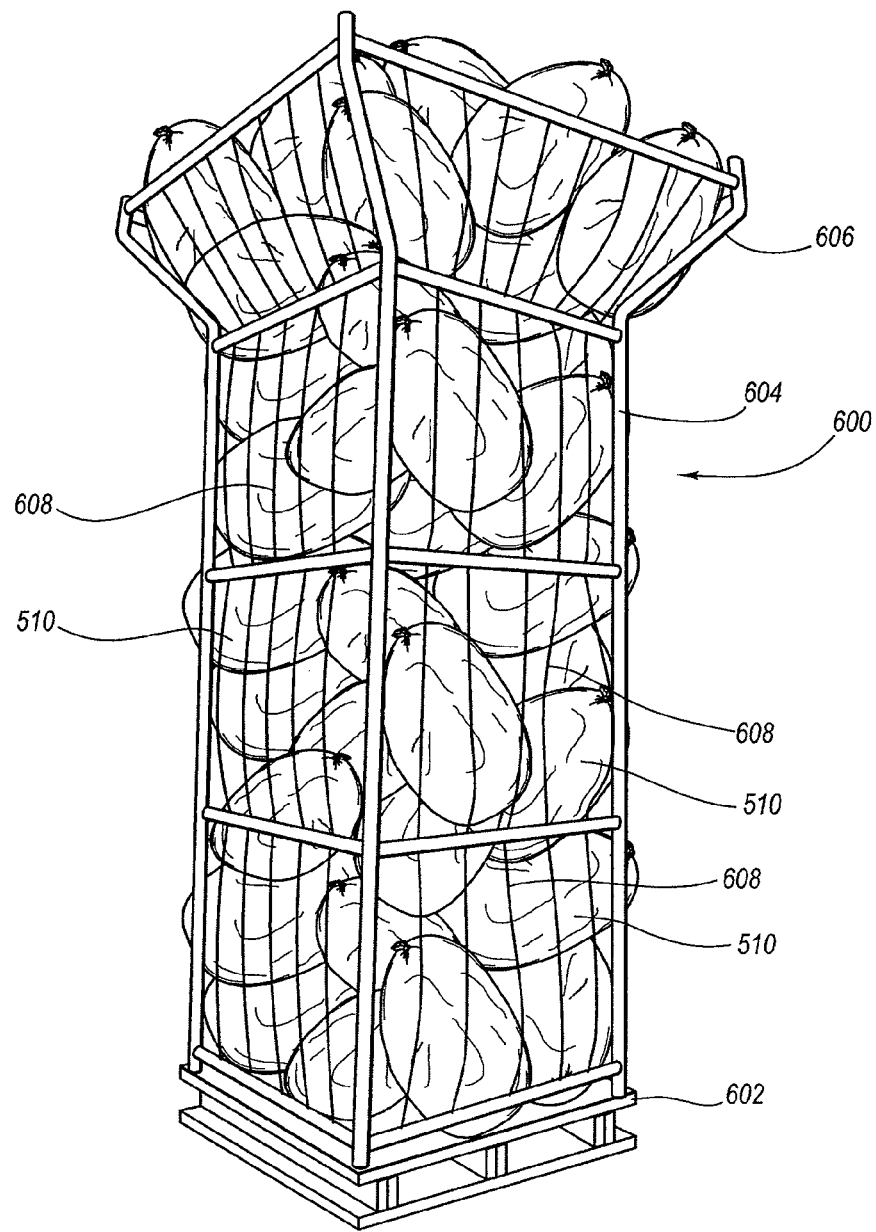
FIG. 11 illustrates a bin for storing recyclable waste prior to its compacting into a composite bale according to another embodiment of the invention.
Figure 12:
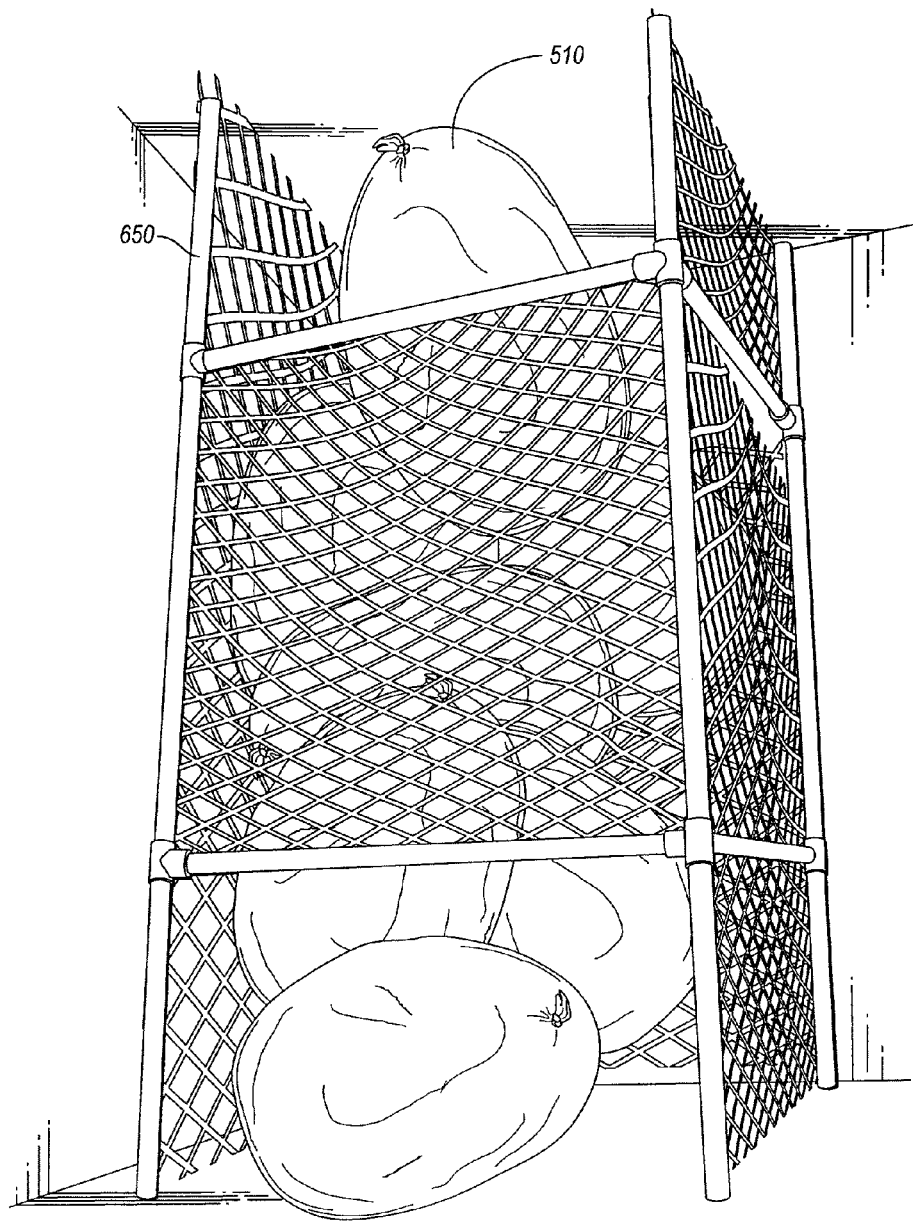
FIG. 12 illustrates another bin for storing recyclable waste prior to its compacting in a composite bale according to another embodiment of the invention.

The gathered waste may then be stored for a brief period of time until sufficient waste is collected to form a bale. Storing recyclable waste according to one embodiment of the invention includes providing a specially designed collection area. As seen in FIGS. 11 and 12, such a collection area may be for example a tall narrow ball bin 600, 650 similar to those currently used to store large rubber balls and the like. Within a ball bin 600, 650 a plurality of bags 510, such as a garbage bags, or other suitable bags or containers such as those described herein, are filled with the accumulated recyclable waste materials. The bags 510 are preferably themselves recyclable plastic film bags, although it will be appreciated that this is not necessarily a limiting feature of the present invention.

A ball bin 600, 650 can be conveniently located near a cardboard baler so that bags 510 of recyclable waste can be stored vertically to minimize occupied floor space. Optionally, each locale at which recyclable waste is located has its own one or more collection bins. Accordingly, and by way of example, grocery and clothing departments may have their own bins, an auto servicing area may have its own bin, a vending/restaurant area may have a separate bin, an office center may have yet another bin, and so forth. The ball bins can also be formed or placed on a pallet 602 or wheeled dolly so it can be moved as desired. In the embodiment of FIG. 11, the ball bin 600 can have a lightweight frame 604, for example formed of PVC or some other hollow tubing. The depicted ball bin has a funneled top opening 606 and plurality of bungee cords or ropes 608 that keep bags 510 from falling out. For storage, bags 510 can be either tossed in through the funneled top opening or pushed between the movable bungee retainer cords 608. The bags can then be removed for compacting by pulling them through the movable bungee retainer cords 608. In the example embodiment depicted of FIG. 12, the ball bin 650 may also be a metal cage having top and bottom openings where the plastic bags 510 can be tossed in and removed.

The bags of recyclable waste are preferably stored in a ball bin until it is completely full. That volume of recyclable waste is then loaded into the baler over a series of compacting cycles to make a composite bale. It has been determined, for example, that one bin of approximately four feet in width, four feet in depth, and ten feet in height can hold the plastic generated over two to three days by a typical large retail store or discount warehouse.

Upon formation of a composite bale, such as for example composite bales 200, 250, 300, 350, 400, 450, the composite bale can then be stored on-site until it is shipped to a processing center, optionally via other distribution locales such as return centers. Because, the recyclable waste has been compacted in the composite bales, it takes up the less space in a trailer or other transportation vehicle as a similar weight of loosely gathered recyclable waste.

At the downstream processing center the bale is separated into its constituent parts. For example, with reference to FIG. 4, plastic layer 304 is separated from recyclable waste layer 306, and the bags within recyclable waste layer 306 are further separated. With respect to FIG. 5, first and second plastic layers 354, 358 of bale 350 are separated from recyclable waste layer 356, and the bags within recyclable waste layer 356 are further separated. Because each of the layers of recyclable material in the composite bale is contiguous, the compacted layers can be easily and readily removed and isolated for recycling. Moreover, where each bag within a recyclable waste layer contains only one type of recyclable waste product, the various types of waste products do not contaminate each other nor the other layers of recyclable material within the bale. A similar separating process can be followed for processing any composite bale formed of recyclable material, including bales similar to bales 200, 250, 400, 450 described herein.

Various approaches can be used to track the weight of recyclable waste that is pressed into each composite bale. One efficient manner of keeping track of the volume of recyclable waste that is compacted in each bale is simply to measure the thickness of each layer of a distinct type of recyclable material and multiply that thickness times other known constants such as the dimensions of the bale to determine an approximate volume. This number is particularly helpful for use in determining the value of the recyclable plastic film that has been recovered.

For example, it is currently known that every three inches of compacted plastic film in a bale measuring sixty inches by forty-eight inches by thirty inches weighs about fifty pounds. A seventy-two inch by forty-eight inch by thirty inch bale, in turn weighs about sixty-five pounds. Thus, upon the formation of the bale the thickness of a layer of plastic film can be approximately measured in inches and a weight estimate can be made.

Alternatively, the thickness of a recyclable waste layer can be estimated as a fraction of the bale thickness. Regardless, the entire bale can also be weighed so that the correct fractional portion of the load is assigned to the recyclable waste.

In yet another alternative, past measurements of the various types of recyclable waste byproducts included in the composite bales can be used. For instance, for a particular size of bag, historical averages for the various types of recyclable waste can be calculated and used to approximate the weight of each type of waste material in the bale. Accordingly, upon creation of the bale, the retailer or other person can indicate on the bale, or on the shipping documents, the number of bags of each type recyclable waste byproduct that are in the bale. In this manner, when the bale is received by the processing center, the processing center can calculate the approximate weight of each recyclable material even without separating the bale. Of course, the processing or recycling center can also separate the bale and count the bags of each type of product to, for example, verify the retailer's count and/or to update historical average data.

In other embodiments, the historical weight averages may be used even without an indication by the retailer of the number of each type of product in the bale. For instance, the processing center may merely separate the bale and count each type of bag. To facilitate such counting, each bag may contain only one type of recyclable waste byproduct. In such cases, when a bale is created, recyclable waste such as plastic film, used plastic bags, HDPE bottles, PET bottles, aluminum cans, plastic hangers, shredded paper, and the like may not be combined into a single bag, but each packaged separately in one or more bags. Further, each type of byproduct may be enclosed in a different color bag such that the byproduct therein can easily be identified by the processing center even without opening the bag. In alternative embodiments, indicia may be provided on the container enclosing the byproduct (e.g., a description or picture of the byproduct) to facilitate identification, or the bags may not include any indicia or other method for distinguishing between types of content.

If a more accurate measurement of the recovered waste products is desired, then the whole bales can be again weighed at the processing or recycling center. Thereafter, after the bales are broken open and the various types of recyclable waste are separated from one another, each bag or each type of byproduct can once more be weighed to get a final accurate measurement of the recovered amount. Of course, not all of these measurements may be necessary depending upon the accuracy and tracking that is desired.

After sorting the various types of recyclable byproducts from each bale, each of the various types of byproducts can be baled separately and/or shipped either on truck or rail car to paper, metal and plastic manufacturers and recyclers throughout the country.

Figure 13:
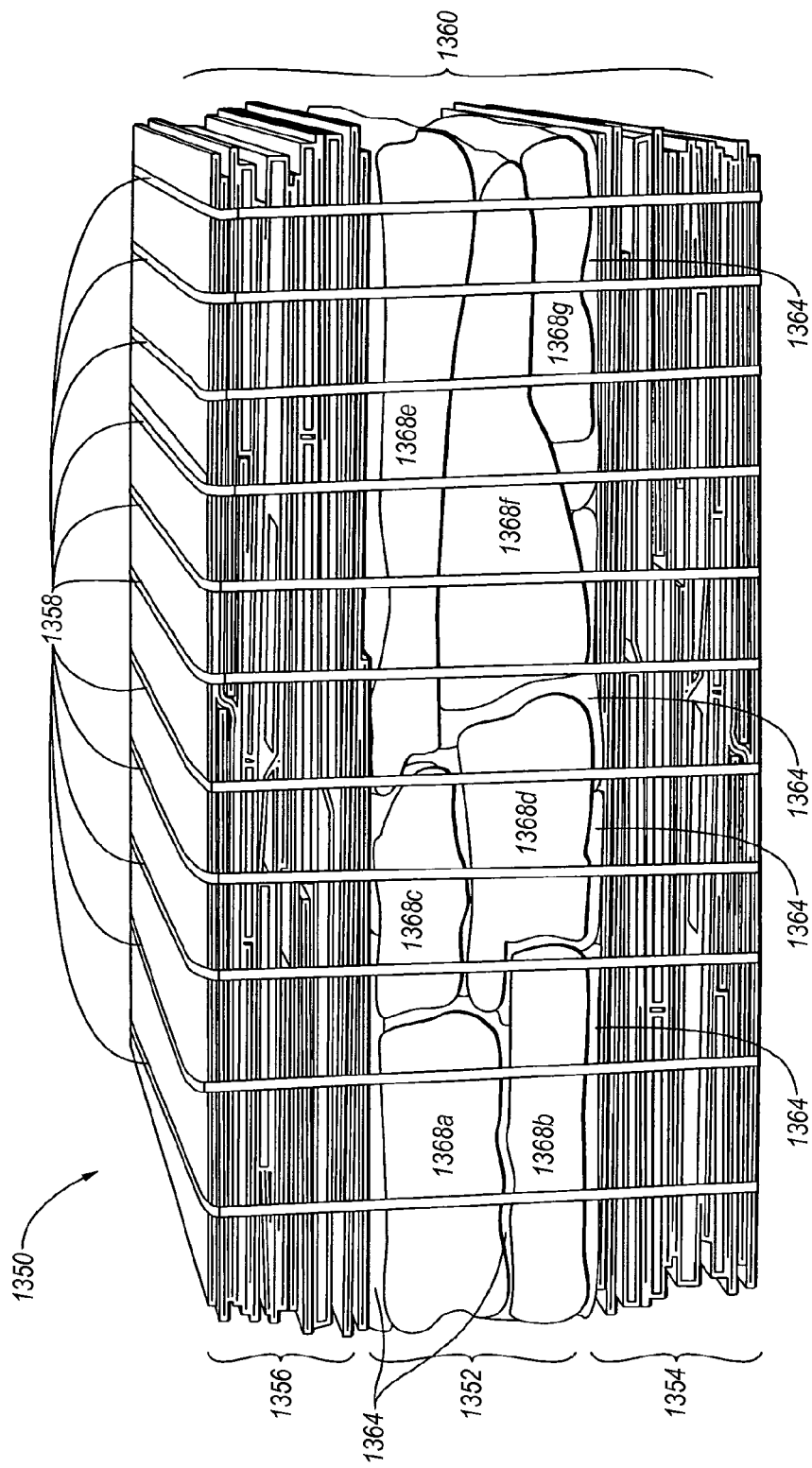
FIG. 13 illustrates a composite bale formed in a cardboard baler according to embodiments of the invention.

Now referring to FIG. 13, an additional embodiment of an exemplary composite bale 1350 is illustrated. As generally depicted in FIG. 13, composite bale 1350 having a thickness 1360 incorporates a first layer 1354 of cardboard, a recyclable waste layer 1352 of multiple types of recyclable waste byproducts, and a second layer 1356 of cardboard. The recyclable waste layer 1352 is in effect sandwiched between the two cardboard layers 1354, 1356. The compacted composite bale is bound together by bands 1358.

Composite bale 1358 acts as a complete packaging system in which a retail or wholesale distribution center—or any other location in which recyclable waste is produced—can package one or more types of recyclable waste byproducts into a single bale for shipment and delivery to a processing and/or recycling center. In the illustrated embodiment, for example, recyclable waste layer 1352 includes a plurality recyclable portions 1368*a*-*g* which include one or more types of recyclable waste. For example, each recyclable portion 1368*a*-*g* may include one or more types of recyclable waste produced by a retail or wholesale distribution center. For instance, recyclable portions 1368*a*-*g* may include plastic hangers, shredded paper, plastic or aluminum beverage containers, plastic fluid containers, shrink wrap, used plastic bags, and the like.

As will be appreciated, particularly in light of the disclosure herein, recyclable portions 1368*a*-*g* may be of varying sizes, shapes and configurations within recyclable layer 1352. In some cases, this variation results from the type of recyclable waste byproduct packaged in composite bale 1350. More particularly, some recyclable waste products are highly compressible, such that when compacted in a baler, the volume the recyclable waste occupies in the bale can be significantly reduced. For instance, used plastic bags and plastic shrink wrap are pliable and also highly compressible. Similarly, plastic beverage containers, plastic fluid containers, and even aluminum beverage cans may contain a significant amount of air when discarded, and when compacted, the air can be discharged and the volume of the recyclable waste reduced.

Other recyclable waste, however, may be less compressible. For instance, plastic hangers do not capture a significant amount of air and are not pliable. Accordingly, when a volume of plastic hangers is compressed in a baler, the hangers maintain much of their original shape, thereby resulting in compression that can be much less significant than the compression of the same volume of, for example, plastic film or plastic beverage containers.

Accordingly, and as illustrated in FIG. 13, when recyclable portions 1368*a*-*g* are compressed and baled, the shapes, sizes and configurations of each portion can vary. For instance, a recyclable portion with plastic hangers (e.g., portion 1368*d*) will result in a greater thickness within composite bale 1350 than a recyclable portion of the same volume that is filled with a more compressible material (e.g., portion 1368*g*).

As discussed in greater detail herein, different recyclable waste byproducts can be packaged separately within composite bale 1350. For instance, recyclable portions 1368*a*-*g* can each be packaged within a compressible container such as, for example, a plastic bag made of a plastic film material. Separating materials into containers is desirable for a variety of reasons. For example, waste byproducts may be generated at different locales within a retail or wholesale distribution center such that it is more convenient for each different locale to package its recyclable waste byproducts separately. In addition, as discussed in more detail hereafter, such separation may facilitate handling of the byproducts at a processing or recycling center.

In one embodiment, the compressible container is a deformable plastic bag container. For instance, in one embodiment, the various recyclable waste products can be enclosed within a used shopping bag or clothing bag, such that the recyclable waste is enclosed within other types of recyclable waste byproducts. In other embodiments, however, the compressible container is not a waste byproduct. For instance, a plastic bag may be obtained for the purpose of packaging of the recyclable waste and not generated by the day-to-day operations of a retail, wholesale or distribution center.

With continued reference to FIG. 13, it will be seen that in some embodiments, a composite bale which packages multiple types of recyclable waste byproducts and/or waste byproducts which are not highly compressible, may further be configured to maintain its structural integrity during storage and shipment of the composite bale. For instance, composite bale 1350 is adapted to maintain its structural integrity where a potential weak point otherwise exists in the bale.

In particular, when different portions 1368*a*-*g* of recyclable waste byproducts are compressed together, they may become rigid and/or not conform to the shape of an adjacent portion. Consequently, when the bale is created, the different portions can shift position during storage and/or transport, thereby weakening the bale. To reduce the effect of such weak points, composite bale 1350 optionally includes bonding agents 1364 between some or all of recyclable portions 1368. Optionally, bonding agents 1364 can be placed in recyclable layer portion 1364 between recyclable portions 1368*a*-*g* and first and second layers of cardboard 1354, 1356.

The bonding agent acts to stabilize the position of recyclable portions 1368*a*-*d* g relative to an adjacent recyclable portion and/or first and second layers 1354, 1356. In one embodiment, for example, bonding agent 1364 includes a compressible material that is sandwiched between two or more of recyclable portions 1368*a*-*g*. As a result, when a baler compresses bonding agent 1364 and recyclable portions 1368*a*-*g*, the compressible bonding agent 1364 can conform to the shape of the adjacent recyclable portions, thereby eliminating or reducing the space between portions and further increasing the structural integrity of the bale.

Bonding agents 1364 may comprise any suitable material. For instance, in one embodiment, bonding agents 1364 include compressible, recyclable waste byproducts generated by a retail, wholesale or distribution center that packages its recyclable waste into composite bale 1350. For instance, byproducts such as plastic film or used plastic bags can be placed between different containers of other recyclable waste products to bond them together and increase the bale strength. Such recyclable waste may be directly placed between recyclable portions 1368*a*-*g* or, in other embodiments, may be placed within a container such as a plastic bag, and the plastic bag then sandwiched between different recyclable portions.

Figure 14:
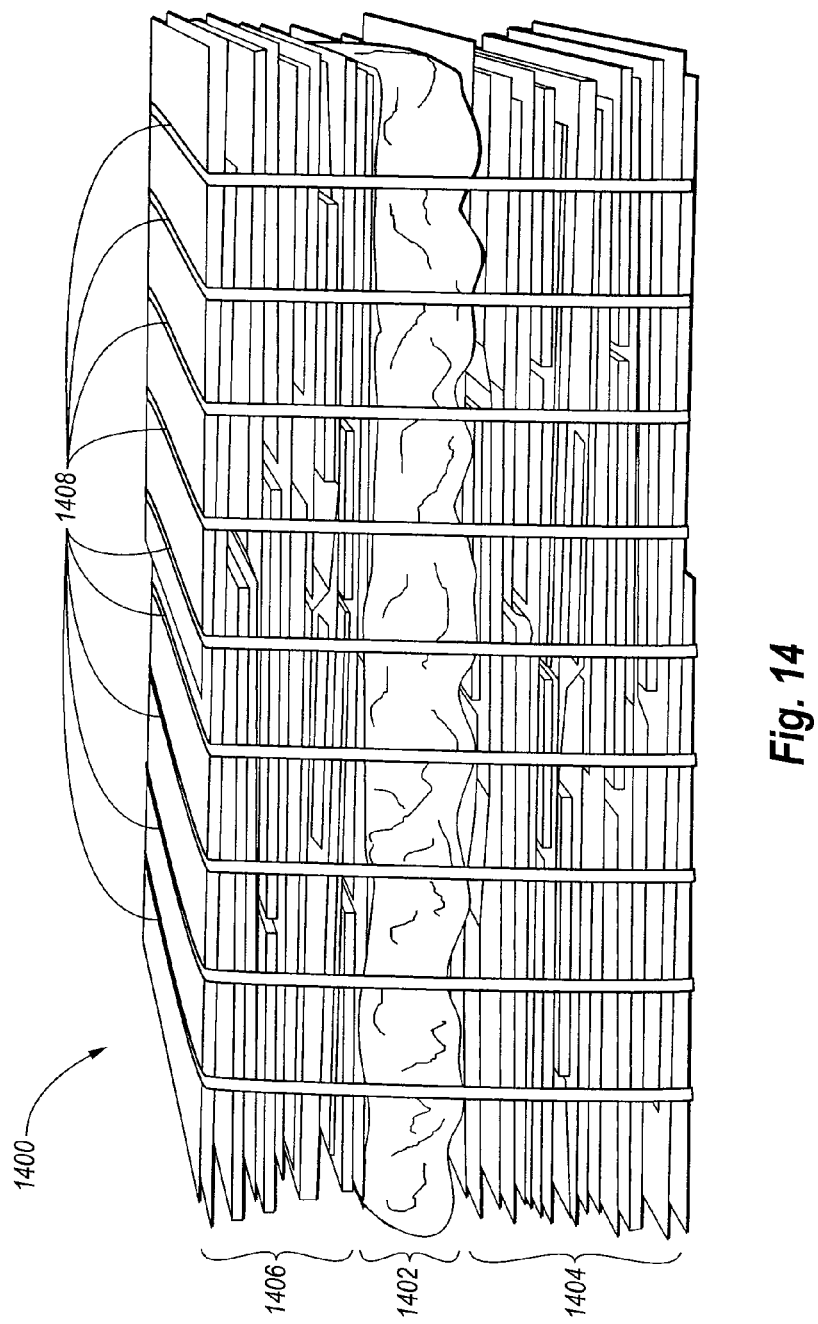
FIG. 14 illustrates a composite bale formed in a cardboard baler according to embodiments of the invention.

As generally depicted in FIG. 14, a combined cardboard and plastic film bale 1400 incorporates a first layer 1404 of cardboard, a layer 1402 of plastic film, and a second layer 1406 of cardboard. The plastic film layer 1402 is in effect sandwiched between the two cardboard layers 1404, 1406. The compacted plastic/cardboard bale is bound together by bands 1408.

It can be readily seen in FIG. 14 how a significant amount of plastic film has been compacted to a very small space in the plastic/cardboard bale. In addition, it is also apparent that a significantly less amount of plastic is used in this plastic/cardboard bale than if the entire bale were formed of only plastic film. Thus, because a smaller amount of plastic film can be compacted in a single bale, the plastic can be disposed of in a timely fashion from a single location. In contrast, if the plastic were required to fill the entire bale, it would require many days, weeks, or even months to fill a single bale, requiring great expense to store a significant amount of un-compacted plastic.

Figure 15:
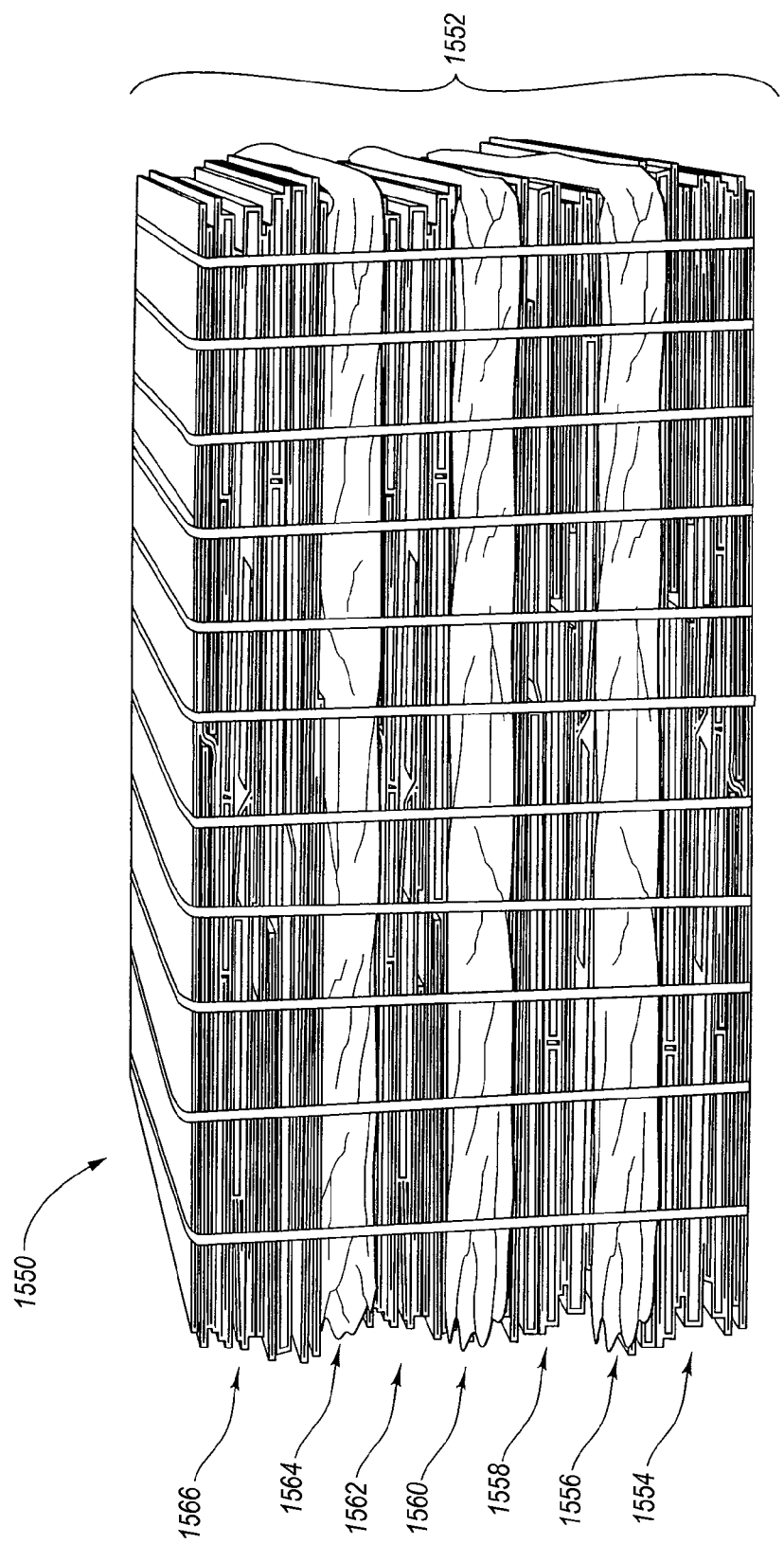
FIG. 15 illustrates a composite bale formed in a cardboard baler according to embodiments of the invention.

Although it is preferred to have cardboard layers both above and below the plastic film layer, other embodiments of the invention may use only a single cardboard layer on one side of a plastic film layer. Alternatively, a plastic/cardboard bale may have numerous layers. For example, FIG. 15 illustrates several plastic film layers 256, 260, 264 sandwiched between several cardboard layers 1554, 1558, 1562, 1566 to form a plastic/cardboard bale having a thickness 1552. Of course, one skilled in the art, in view of the disclosure herein, could configure a plastic/cardboard bale with any number of layers of plastic and cardboard. The limiting factor is that the thickness of each plastic layer and the number of such plastic layers must be cost effective. This use of numerous plastic film layers may be preferable in locations where there is little storage space for loose plastic or cardboard and so it is desirable to frequently compact the on hand loose plastic and cardboard in multiple layers.

Figure 16:
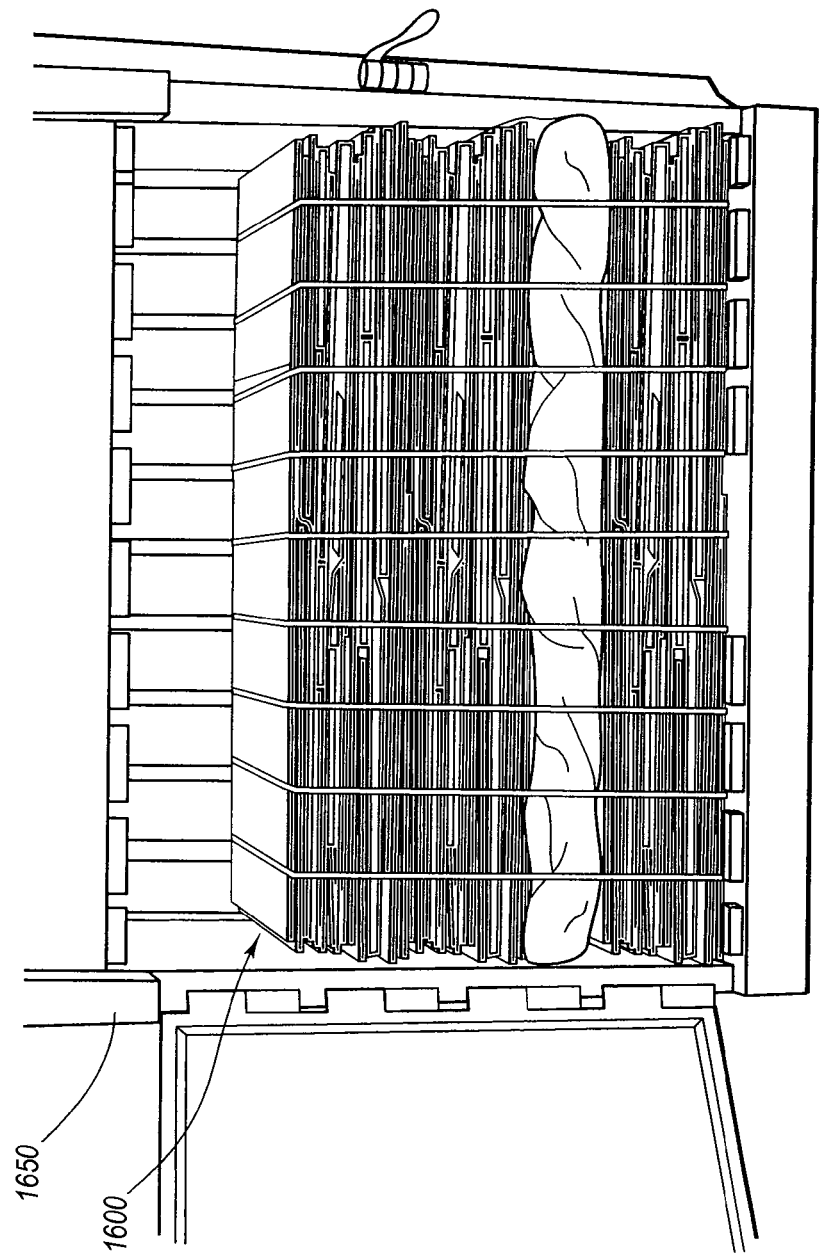
FIG. 16 illustrates a composite bale formed in a cardboard baler according to embodiments of the invention.

FIG. 16 illustrates a completed and bound bale 1600 seated within the bottom portion of baler 1650. Alternatively, as previously discussed, multiple layers of plastic film can be formed within a single bale and top or bottom cardboard bales can be omitted.

Figure 17:
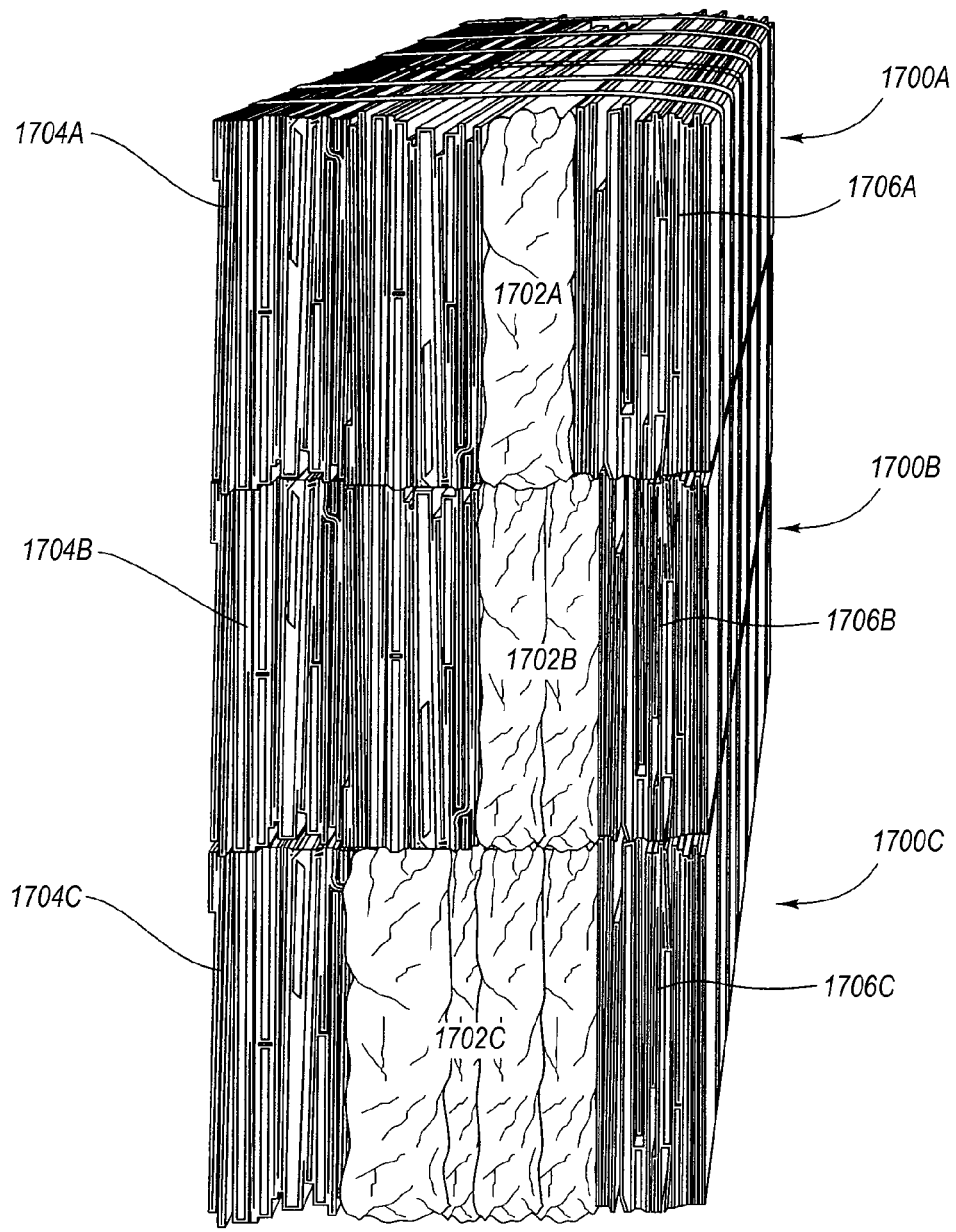
FIG. 17 illustrates a composite bale formed in a cardboard baler according to embodiments of the invention.

Referring now to FIG. 17, forming stacks of plastic/cardboard bales 1700A-C is important in the recycling industry because it allows for economy of storage and transport efficiency. Completed plastic/cardboard bales 1700A-C are typically stored for a time at distribution and recycling centers, as seen in FIG. 17, stacked on top of one another to conserve space. During transport to these locations, bales are typically stacked on top of one another on a flat-bed trailer. As the trailers travel, turn corners, bounce, etc., the need for increased stability is important as bales shift and tend to lose their structural integrity. The weight of these bales is often over one thousand pounds, accentuating the tendency of the bales to shift and lose structural integrity.

The structure of the inventive bales is particularly beneficial in that having cardboard layers 1704A-C, 1706A-C sandwich plastic layers 1702A-C forms structural bookends that allow the bales to maintain form and be transported safely and effectively. In other words, whereas the plastic layers are not strong enough to effectively stack perpendicularly on their own, the cardboard end layers provide excellent structural integrity so the bales can be stacked perpendicular to gravity without collapsing. The top and bottom cardboard layers 1704A-C, 1706A-C therefore preferably each have a thickness of at least about twelve inches to provide good support, but as few as six inches or even three inches may also be used in some embodiments.

In addition, the cardboard ends of the plastic/cardboard bales allow the bales to be tightly secured by straps tightened by a winch on a flat-bed trailer without the force of the straps breaking the bales part.

Accordingly, one embodiment of the invention is a method of transporting or storing plastic/cardboard bales by stacking two or more plastic/cardboard bales, wherein each of the bales has a cardboard layer, perpendicular to the stack, on each end of each bale such that the bales do not lose structural integrity and do not collapse. Such cardboard layers preferably have a thickness of least about three inches, more preferable at least about six inches, still more preferably at least about twelve inches.

In addition to providing structural support, the top and bottom cardboard layers 1704A-C, 1706A-C also help contain loss of debris when the bales 1700A-C are transported on an open flat-bed trailer. Cardboard is less likely to pull loose in the wind than plastic and so having cardboard at the end pieces reduces the likelihood of plastic being pulled loose. The cardboard layers are also beneficial when the bales are stored on the ground in that the cardboard absorbs water, reducing the amount of water entering the plastic.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for forming a layered bale of compressed recyclable waste, comprising:
    forming a first compressed outer layer of cardboard;
    forming a compressed recyclable waste layer comprising a plurality of bags filled with recyclable waste materials, the plurality of bags comprising at least a first bag filled with a recyclable waste material substantially consisting of only a first type of material substance and at least a second bag filled with another recyclable waste material substantially consisting of only a second material substance that is different than the first material substance and that is also different than a material used to make the second bag, such that the compressed recyclable waste layer comprises a plurality of recyclable waste materials that are packaged separately in at least the first and second bags;
    forming a second compressed outer layer of cardboard, the first and second compressed outer layers of cardboard being positioned on opposing sides of the compressed recyclable waste layer; and
    binding together the first compressed outer layer of cardboard, the compressed recyclable waste layer, and the second compressed outer layer of cardboard to form a layered bale of compressed cardboard and recyclable waste materials.

2. The method of claim 1, wherein at least the first and second bags of the plurality of bags are configured to enable identification of the first and second material substances packaged within each of the first and second bags without opening each of the first and second bags.

3. The method of claim 1, wherein the plurality of bags are color-coded to enable the identification of the first and second material substances within at least each of the first and second bags.

4. The method of claim 1, wherein each of the first and second bags are marked with different indicia corresponding to the first and second material substances packaged within each of the first and second bags, respectively.

5. The method of claim 1, wherein all recyclable waste of the first material substance is disposed within one or more bags having a first color that is different than a color of the second bag.

6. A method as recited in claim 1, wherein forming each of the first compressed outer layer of cardboard, the compressed recyclable waste layer, and the second compressed outer layer of cardboard includes using a baler and performing one or more compression cycles with the baler.

7. The method of claim 6, wherein the method includes forming the first and second compressed outer layers of cardboard and the compressed recyclable waste layer by compressing the first and second compressed outer layers and the compressed recyclable waste layer with different compression cycles of the baler.

8. The method of claim 7, wherein the method includes compressing the first outer layer prior to compressing either of the second outer layer or the compressed recyclable waste layer, and compressing the compressed recyclable waste layer prior to compressing the second outer layer.

9. A method as recited in claim 1, wherein the first material substance is selected from a first group consisting of plastic bags and plastic film, and wherein the second material substance is selected from a second group consisting of aluminum cans, plastic bottles, plastic clothing hangers, and shredded paper.

10. A method as recited in claim 1, wherein said bale is bound together with wire.

11. The method as recited in claim 1, wherein the compressed recyclable waste layer is composed of recyclable waste materials that exclude cardboard and which comprise at least two materials selected from a group consisting of plastic bags, plastic film, aluminum cans, plastic bottles, plastic clothing hangers, and shredded paper.

12. The method as recited in claim 1, wherein the compressed recyclable waste layer visibly extends an entire length of said bale, from a first end of said bale to an opposing second end of said bale, as well as an entire width of said bale, from a first side of said bale to an opposing second side of said bale.

13. The method as recited in claim 1, wherein the method further includes forming at least one additional layer of either cardboard or recyclable waste material within the form a layered bale of compressed of cardboard and recyclable waste materials prior to said binding.

14. A method for forming a bound and layered bale of compressed recyclable waste, comprising:
   packaging a first recyclable waste of a first material substance within a first bag, the first bag containing substantially only the first material substance;
   packaging a second recyclable waste of a second material substance within a second bag, the second bag containing substantially only the second material substance which is different than the first material substance;
   inserting a recyclable material for a first outer layer into a baler;
   inserting the first and second bags into the baler;
   inserting additional recyclable material for a second outer layer into the baler;
   operating the baler to form a compressed recyclable waste layer out of at least the first and second bags and two compressed recyclable outer layers positioned on opposing sides of the compressed recyclable waste layer, thereby effectively sandwiching the compressed recyclable waste layer, the compressed recyclable waste layer comprising at least the first bag filled with substantially only the first material substance and at least the second bag filled with substantially only the second material substance; and
   binding the compressed recyclable waste layer and the first and second compressed outer layers into a bound and layered bale of compressed recyclable waste materials.

15. The method of claim 14, wherein at least the first and second bags of the plurality of bags are configured to enable identification of the first and second material substances packaged within each of the first and second bags without opening each of the first and second bags.

16. The method as recited in claim 14, wherein the method further includes inserting at least one additional material within the baler and compressing the at least one additional material prior to the binding and to thereby form at least one additional layer of the bound and layered bale and which is visible along a width and length of the bound and layered bale.

17. The method recited in claim 14, wherein the method includes:
   operating the baler with a first set of one or more compression cycles to form at least one of the two compressed recyclable cardboard layers prior to inserting the first and second bags into the baler; and
   operating the baler with a second set of one or more compression cycles to form the compressed recyclable waste layer that is composed of at least the first and second bags.

18. The method of claim 14, wherein both of the first and second material substances is different than a material used to make the first and second bags.

19. The method recited in claim 14, wherein the recyclable material of the first and second outer layers is of a same type.

20. The method recited in claim 19, wherein the recyclable material of the outer layers comprises cardboard.

* * * * *

UNITED STATES PATENT AND TRADEMARK OFFICE
CERTIFICATE OF CORRECTION

PATENT NO.       : 8,640,611 B2
APPLICATION NO.  : 13/610565
DATED            : February 4, 2014
INVENTOR(S)      : Sasine et al.

It is certified that error appears in the above-identified patent and that said Letters Patent is hereby corrected as shown below:

In the Specification:

Column 8
Line 37-38, change "it however, the" to --however, the--
Line 49, change "bale 30" to --bale 300--

Column 9
Line 64, change "bails" to --bales--
Line 65, change "bail 450" to --bale 450--
Line 67, change "bail 450" to --bale 450--

Column 10
Line 9, change "bail 450" to --bale 450--
Line 11, change "bail 450" to --bale 450--
Line 48, change "bail" to --bale--
Line 61, change "employ" to --employee--

Column 11
Line 24, change "It some" to --In some--
Line 25, change "is preferable" to --it is preferable--
Line 34, change "holes 510a-d" to --holes 512--

Column 13
Line 3-4, change "for example" to --for example,--
Line 24, change "for example" to --, for example,--
Line 29, change "up the less" to --up less--

Column 14
Line 62, change "bale 1358" to --bale 1350--

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,640,611 B2

Column 16
Line 17, change "1368*a-d* g" to --1368*a-g*--
Line 63, change "plastic film layers 256, 260, 264" to --plastic film layers 1556, 1560, 1564--

In the Claims:

Column 19, Claim 13
Line 17, change "within the form a layered" to --within the layered--
Line 18, change "compressed of cardboard" to --compressed cardboard--

Column 20, Claim 17
Line 24-25, change "two compressed recyclable cardboard" to --first and second outer--